(12) United States Patent
Narayan et al.

(10) Patent No.: US 11,956,140 B2
(45) Date of Patent: Apr. 9, 2024

(54) SYSTEMS AND METHODS FOR CONSTRUCTING SERVICE-AWARE VIRTUAL TOPOLOGIES IN WIDE AREA NETWORKS

(71) Applicant: Arista Networks, Inc., Santa Clara, CA (US)

(72) Inventors: Abhijith Kudupu Narayan, Santa Clara, CA (US); Venkitraman Kasiviswanathan, San Ramon, CA (US); Alton Lo, Freemont, CA (US); Udayakumar Srinivasan, Santa Clara, CA (US); Kumaran Narayanan, San Ramon, CA (US)

(73) Assignee: Arista Networks, Inc., Santa Clara, CA (US)

( * ) Notice: Subject to any disclaimer, the term of this patent is extended or adjusted under 35 U.S.C. 154(b) by 152 days.

(21) Appl. No.: 17/575,839

(22) Filed: Jan. 14, 2022

(65) Prior Publication Data
US 2023/0105873 A1    Apr. 6, 2023

Related U.S. Application Data

(60) Provisional application No. 63/251,458, filed on Oct. 1, 2021.

(51) Int. Cl.
*H04L 45/02* (2022.01)
*H04L 45/586* (2022.01)
*H04L 69/22* (2022.01)

(52) U.S. Cl.
CPC ............ *H04L 45/02* (2013.01); *H04L 45/586* (2013.01); *H04L 69/22* (2013.01)

(58) Field of Classification Search
None
See application file for complete search history.

(56) References Cited

U.S. PATENT DOCUMENTS

| | | | |
|---|---|---|---|
| 2008/0225751 A1* | 9/2008 | Kozat | H04L 45/38 370/254 |
| 2010/0103813 A1* | 4/2010 | Allan | H04L 45/28 370/218 |

(Continued)

OTHER PUBLICATIONS

P. Quinn, Ed., et al., Network Service Header (NSH), Internet Engineering Task Force (IETF), RFC 8300, Jan. 2018, pp. 1-40, ISSN: 2070-1721, Internet Engineering Task Force (IETF).

*Primary Examiner* — Xavier S Wong
(74) *Attorney, Agent, or Firm* — Tianyi He

(57) ABSTRACT

A method for servicing network traffic in a wide area network (WAN) comprising a plurality of network devices is provided. The method is executed by a network device among the plurality of network devices and comprises: receiving a request to transmit the network traffic to a destination network device where the request specifies that the network traffic is to be serviced by a network service; determining, based on the request and using a service-aware virtual topology (SAVT) routing table, a path through the WAN for reaching the network service and a service instance identifier (ID) of the network service; configuring the network traffic to include a service bit indicating whether service is to be performed and instructions specifying the path for reaching the network service; and transmitting, after configuring the network traffic, the network traffic toward the destination device through the at least one network service.

20 Claims, 22 Drawing Sheets

(56) References Cited

U.S. PATENT DOCUMENTS

| | | | | |
|---|---|---|---|---|
| 2014/0043972 | A1* | 2/2014 | Li | H04L 47/17 |
| | | | | 370/392 |
| 2017/0155706 | A1* | 6/2017 | Hiltunen | H04L 43/045 |
| 2017/0187607 | A1* | 6/2017 | Shaikh | H04L 41/342 |
| 2018/0302807 | A1* | 10/2018 | Chen | H04L 41/12 |
| 2022/0038554 | A1* | 2/2022 | Merwaday | H04L 67/63 |

* cited by examiner

Service Aware Virtual
Topology Routing Table
690

| APP | DST | SERVICE INSTANCE ID | ROUTE |
|---|---|---|---|
| APP-1 | Internal Network Service B Hosted On Hub Network Device B | SERV_B | [1] To hub network device A via Link-X of branch network device B →<br>Direct to hub network device B via Link-Y of hub network device A →<br>To internal network service B via Link-A of hub network device B.<br><br>[2] To hub network device A via Link-X of branch network device B →<br>To hub network device B through Internet via Link-Z of hub network device A →<br>To internal network service B via Link-A of hub network device B. |
| APP-1 | Internal Network Service A Hosted On Hub Network Device A | SERV_A | Direct to hub network device A via Link-X of branch network device B →<br>To internal network service A via Link-A of hub network device A. |
| ... | | | |

FIG. 6D

SYSTEMS AND METHODS FOR CONSTRUCTING SERVICE-AWARE VIRTUAL TOPOLOGIES IN WIDE AREA NETWORKS

CROSS-REFERENCE TO RELATED APPLICATIONS

This application claims priority from U.S. Application No. 63/251,458, filed Oct. 1, 2021, the entire contents of which are incorporated herein.

BACKGROUND

A communication system may enable devices to communicate with one another. The communication system may include devices that relay information from a sending device to a destination device.

BRIEF DESCRIPTION OF DRAWINGS

Certain embodiments of the disclosure will be described with reference to the accompanying drawings. However, the accompanying drawings illustrate only certain aspects or implementations of the disclosure by way of example and are not meant to limit the scope of the claims.

FIGS. 6A-6E show an example in accordance with one or more embodiments described herein.

DETAILED DESCRIPTION

Figure 1A:
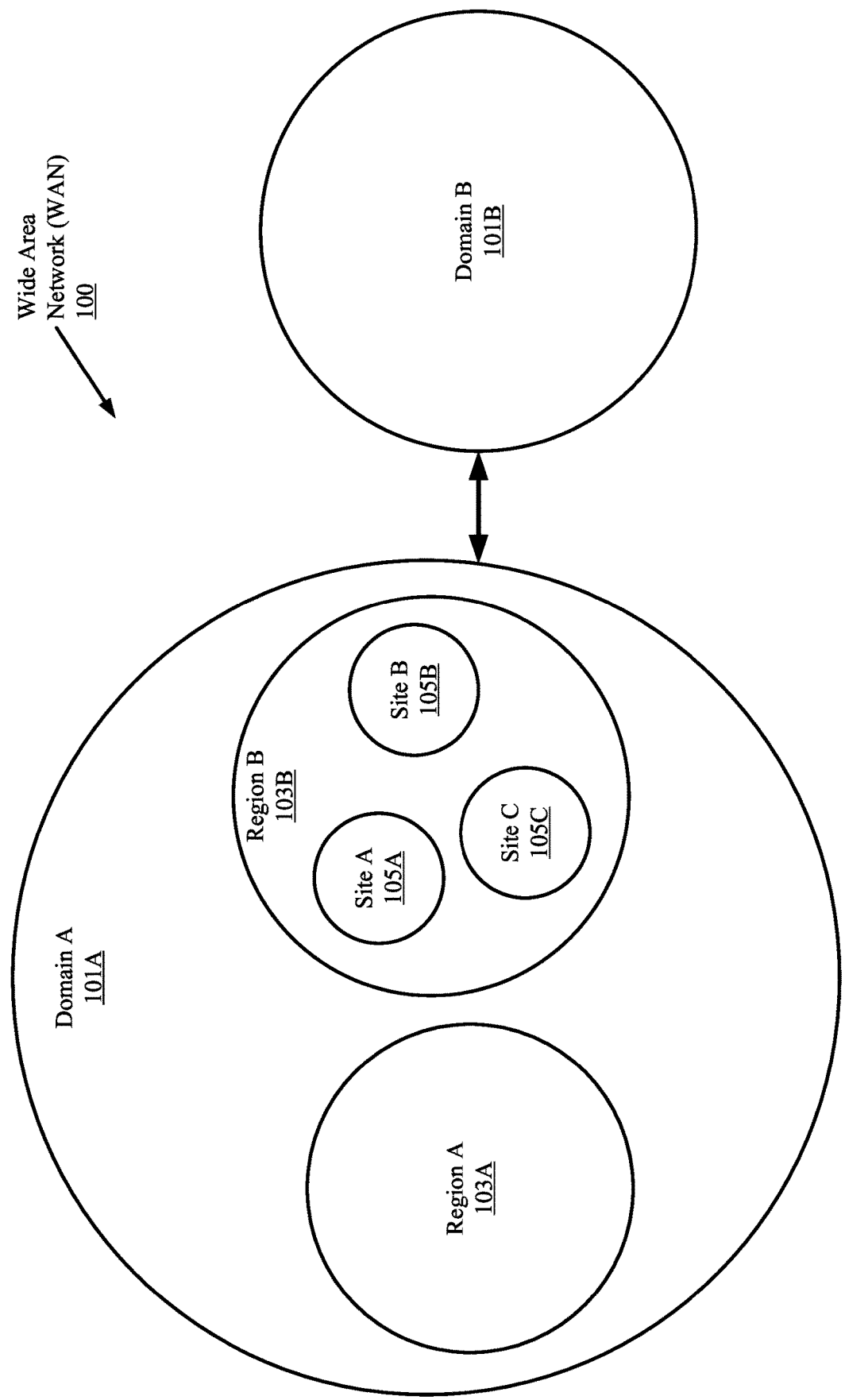
FIG. 1A shows an example of a wide area network (WAN) in accordance with one or more embodiments.

Specific embodiments will now be described with reference to the accompanying figures.

To simplify managing network policies, networks (e.g., enterprise networks, which may also be referred to as "wide area networks (WAN)") are hierarchically divided into different levels (e.g., domains, regions, sites, and network devices). The network devices are interconnected such that one network device may be connected to another network device using multiple paths (e.g., single virtual-hop paths representing a connection using a virtual tunnel link between two network devices and multiple virtual-hop paths representing a combination of two or more single-virtual hop paths) through one or more service providers (SPs). Network traffic transmitted between these network devices are engineered to be sent, using Path Selection (PS), on a path that is less congested than others. The direct (i.e., single virtual-hop) paths are discovered automatically by the network devices through exchanging their SP connectivity information (herein referred to as "reachability information") using border gateway protocol (BGP) techniques. Consequently, the network devices only know the direct paths between one another but are not aware of all possible paths (e.g., multiple hop paths) via other network devices within the network. Furthermore, even if these multiple hop paths (also referred to herein as "multiple virtual-hop paths") were to be revealed to the network devices, the network devices will still not be able to determine which paths are best-suited for specific applications (e.g., voice services, video services, large data transfers, secure data transfers, etc.) (also referred to as "application classification" in FIG. 4).

Embodiments of this disclosure provide an application-aware virtual topology (AAVT) routing table for each network device within the network that includes: (i) a set of paths including predetermined types (e.g., single virtual-hop, multiple virtual-hop, etc.) of paths (or, alternatively, all types of paths) between a network device and all other network devices in the network; and (ii) path metrics of each path of the set of paths. Consequently, using the AAVT routing table, each network device will advantageously be aware of all paths (not just being limited to single virtual-hop paths) between itself and other network devices within the network and will also be able to advantageously select the most-suitable path for a specific application to be executed.

In one or more embodiments disclosed herein, the AAVT routing table may be constructed by one or more network controllers disposed within the network. Each network controller may include a route reflector and a route identifier agent (referred to collectively as "a network controller agent"). Alternatively, the route reflector may be a distinct and separate device. A network device within the network may measure path metrics (e.g., latency, jitter, loss, total bandwidth, and current utilizations, etc.) of paths between itself and other network devices it is directly connected with (i.e., through a single virtual-hop path) using in-band techniques (e.g., BGP as discussed above).

In one or more embodiments disclosed herein, the path metrics and reachability information (herein collectively referred to as "path information") are exchanged between the route reflector and all of the network devices in the network using border gateway protocol (BGP). Alternatively, each region within the network may include a hub network device that aggregates the path information of all network devices within the region into an aggregated path information database, and transmit the aggregated path information database to the route reflector using BGP. This aggregated path information database may also include paths between the hub network device and hub network devices of other regions that are connected to the same SP.

In one or more embodiments disclosed herein, the route reflector provides the aggregated path information database to the route identifier agent of the network controller. The route identifier agent uses the aggregated path information database to generate an underlay graph representing a path topology of each region (which may include all WAN paths within one or more sites of each region). When multiple regions are interconnected using hub network devices, the route identifier agent uses the aggregated path information database from each hub network device to generate an underlay graph including the path topology across all of the regions. This underlay graph, along with each network device's policy and requirements (discussed below), is used to construct the AAVT routing table for each network device.

In one or more embodiments disclosed herein, the route identifier agent analyzes the path information to: (i) discover all single and multiple virtual-hop paths for each network device; and (ii) determine a most-suitable path (or a set of most-suitable paths) for each application being executed on each of the network devices (i.e., to compile usability information for each path of a network device) while also considering network transmission policies set for each network device. For example, a network device executing a voice application may want to utilize a path with less jitter and latency. The embodiments are not limited to this example. These path metrics may be updated periodically, e.g., every five seconds, to the route identifier agent. If the path state changes (i.e., a path between two network devices is taken down), an immediate update may be sent to the route identifier agent. In one or more embodiments, direct paths between network devices (i.e., single virtual-hop paths) through the same SP may not be included in the aggregated path information database. Consequently, the route identifier agent would only be relied upon to discover multiple virtual-hop paths between the network devices.

In one or more embodiments disclosed herein, based on analyzing the path information, the route identifier agent may program (through transmission of the AAVT routing tables using the route reflector) each network device to install one or more paths included in the underlay graph. The paths to be programmed in each network device may depend on the requirements (e.g., types of applications being handled, security policy, reachability requirements, multi-hop metrics support, etc.) of each network device (herein collectively referred to as "network device information and policies").

Additionally, in one or more embodiments, the network (e.g., the WAN) may also include services (e.g., firewalls, internet exit services such as secure internet gateways (SIGs)/secure access secure edge (SASE), network address translation (NAT) services, software as a service (SAAS), etc.) for network traffic entering and going outside of the network. However, these network devices are not aware of all of the possible paths through the network to reach these services. As a result, network devices may never know of the existence of certain paths in the network that likely include better network characteristics (e.g., quality of service (QoS) restrictions, latency, bandwidth, jitter and loss-rate, etc.).

Consequently, one or more embodiments advantageously provide network devices with information to determine an optimal service insertion point (i.e., point in the network where network traffic is serviced by a given service) and to determine one or more optimal paths to the given service. In particular, one or more embodiments disclosed herein provide network devices with service information such as, but is not limited to: a type of the service (e.g., a label such as IE (internet exit) FW (firewall), etc.), a service instance identification (ID) identifying one or more services, a location of each service on the network, a service health of each service (e.g., connectivity quality, latency, bandwidth jitter and loss-rate, etc.), etc. This service information may be provided by each service to a network controller using protocols such as, but not limited to, border gateway protocol (BGP). The network controller aggregates the service information with information specified in the AAVT routing table to generate service-aware virtual topology (SAVT) routing tables including one or more optimal paths for each network device to reach a given service.

In one or more embodiments disclosed herein, a network device may configure a header of network traffic (e.g., a data packet) to include: (a) a service bit indicating whether the network traffic needs to be serviced; (b) a first portion for including a service instance ID of a given service that serviced the network traffic; (c) a second portion for including hop stacks information with hop stacks instruction code (both of which are described in more detail below in reference to FIGS. 5A-5C and 6E) that steers the network traffic to the correct destination; etc. Adding this information in the header allows network devices to apply services for a given flow in both directions (e.g., the forward path and the reverse path) using the service application point in the network. This advantageously results in network traffic from a given source to destination and response network traffic from the destination back to the source to pass through and be serviced by the same service.

Additionally, knowing the location of all services on the network and all possible paths to each service advantageously allows one or more embodiments to automatically load balanced network traffic within the network. For example, if more than a single instance of a certain service exists within the network, the network devices may be configured (using the virtual topology routing tables) to distribute network traffic flow equally across these services. As another example, if a particular branch office in the network includes more than one service provider connection, network devices may be configured to (using the virtual topology routing tables) automatically load balanced network traffic flow (for all network traffic to and from the branch office) across all of the service provider connections to reach other network devices and/or service application points.

Various embodiments of the disclosure are described below.

FIG. 1A shows an example wide area network (WAN) (100) in accordance with one or more embodiments disclosed herein. The WAN (100) may be a telecommunications network that extends over a large geographic area for implementing computer networking features. As shown in FIG. 1A, the WAN (100) may be divided into a hierarchy including, but not limited to, domains (101A, 101B), regions (103A, 103B), and sites (105A-105C). As one example, each domain (101A, 101B) may cover a continent (e.g., North America, Europe, etc.), each region (103A, 103B) may cover some or more states, cities, and/or provinces within the domain (101A, 101B), and each site may represent a physical location (and or virtual instance thereof) (e.g., a building such as an office, school, hospital, etc.) within a region (103A, 103B).

Although the WAN (100) of FIG. 1A is shown as having only two domains (101A, 101B), two regions (103A, 103B), and three sites (105A, 105C), one of ordinary skill in the art would appreciate that the WAN (100) may have any number of each of these components without departing from the scope of one or more embodiments herein. Additionally, different terms and/or examples may be used to describe each hierarchical level of the WAN (100) without departing from the scope of one or more embodiments. For example, a domain may cover a portion of (e.g., half) of a continent rather than a full area of the continent.

In one or more embodiments, each domain (101A, 101B), region (103A, 103B), and site (105A-105C) of the WAN (100) may include network devices (discussed in more detail below in FIG. 1B) that are able to communicate (e.g., transfer information in the form of network traffic such as data packets) with one another using one or more service providers (e.g., 119A, 119N). As an example, each site (105A-105C) may include one or more branch network devices (e.g., 111A, 111N, FIG. 1B). Each region (103A, 103B) may include at least one hub network device (e.g., 113A-113N, FIG. 1B) as a relay point for the branch network devices of that region to communicate with network devices in other regions (including regions of other domains). The hub network device may also be located at one of the sites (105A-105C) along with one or more of the branch network devices. Additionally, each domain (101A, 101B) may have a network controller (e.g., 117, FIG. 1B) in charge of controlling and/or monitoring the network devices within that domain.

In one or more embodiments, the WAN (100) may also include services (also referred to herein as "network services") (e.g., firewalls, internet exit services such as secure internet gateways (SIGs)/secure access secure edge (SASE), network address translation (NAT) services, software as a service (SAAS), etc.) for network traffic entering and going outside of the WAN (100). These network services (internal network services (114A-114N) and external network services (118A-118N)) are described in more detail below in reference to FIG. 1B

A more detailed example of the WAN (100) structure with network devices included within each level of the WAN (100) hierarchy is provided below in reference to FIG. 3A. A more detailed example of the WAN (100) structure with network devices and services included within each level of the WAN (100) hierarchy is provided below in reference to FIG. 5A.

Figure 1B:
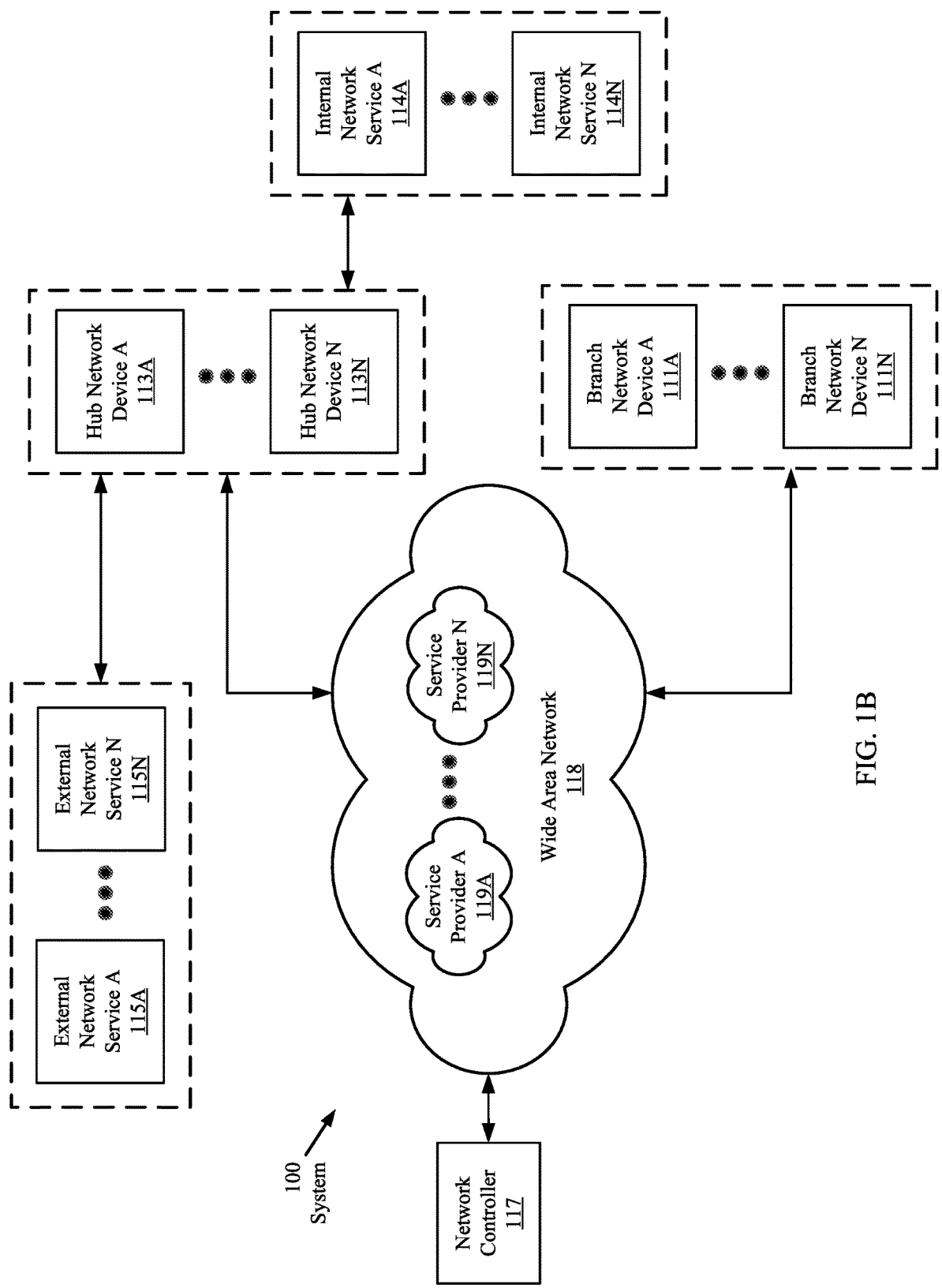
FIG. 1B shows a system in accordance with one or more embodiments described herein.

FIG. 1B shows a system (110) in accordance with one or more embodiments of the disclosure. As discussed above, the system (110) may include components that are physically located within each hierarchical level of the WAN (100). In particular, the system (110) includes one or more branch network devices (111A, 111N), one or more hub network devices (113A, 113N), and a network controller (117) that are connected through a network (118) composed of one or more service providers (119A, 119N). The system (110) may also include one or more internal network services (114A, 114N) and one or more external network services (115A, 115N) that may be accessed by the hub network devices (113A, 113N) and the branch network devices (111A, 111N). Each of these components is described below.

In one or more embodiments disclosed herein, the one or more branch network device(s) (111A, 111N) are physical devices that include persistent storage, memory (e.g., random access memory), one or more processor(s) (including a switch chip), and two or more physical ports. Examples of the branch network devices (111A, 111N) include, but are not limited to, a router, a switch, a top of rack (TOR) switch, and a multilayer switch that are connected to one or more client devices (not shown) (e.g., computers, laptops, smartphones, tablets, etc.). As discussed above, in the context of the WAN (100) in FIG. 1A, each site (105A-105C) of the WAN (100) may include one or more of the branch network devices (111A, 111N). The branch network devices (111A, 111N) are not limited to the aforementioned specific examples.

The switch chip is hardware that determines which egress port on a branch network device (111A, 111N) to forward packets (which may be in the form of media access control (MAC) frames). The switch chip may include egress and ingress ports that may connect to ports on the branch network device (111A, 111N). Each port may or may not be connected to another device (e.g., a server, a switch, a router, etc.). The branch network device (111A, 111N) may be configured to receive the packets via the ports.

Additionally, the persistent storage in the branch network devices (111A, 111N) may include any type of non-transitory computer readable medium that stores data. For example, the data in the persistent storage may be instructions, which, when executed by one or more processor(s) in the branch network device (111A, 111N), enable the branch network device (111A, 111N) to perform one or more functions of the branch network device (111A, 111N).

In one or more embodiments disclosed herein, similar to the branch network devices (111A, 111N), the one or more hub network devices (113A, 113N) are physical devices that include persistent storage, memory (e.g., random access memory), one or more processor(s), and two or more physical ports. Examples of the hub network devices (113A, 113N) include, but are not limited to, a hub router that connects and manages one or more branch network devices (111A, 111N). For example, a hub network device (113A, 113N) may be configured as a network hub that broadcasts data to every branch network device (111A, 111N) that is connected to the hub network device (113A, 113N). As discussed above, in the context of the WAN (100) in FIG. 1A, each region (103A, 103B) may include at least one hub network device (113A, 113N) that is connected to each of the branch network devices (111A, 111N) at the sites (105A-105C) within the region (103A, 103B). For example, for region B (103B) with multiple sites (105A-105C), the hub network device (113A, 113N) may be located at one of the sites (105A-105C) within region B (103B). The at least one hub network device (113A, 113N) is configured as the point of communication for that region with network devices disposed in other regions of the enterprise network. The hub network devices (113A, 113N) are not limited to the aforementioned specific examples.

In one or more embodiments disclosed herein, the internal network services (114A, 114N) may be network services such as, but are not limited to, next-generation firewall (NGFW) services and network address translation (NAT) services to be implemented on network traffic traveling within the WAN (e.g., 100, FIG. 1A). These internal network services (114A, 114N) may be hosted by one or more of the hub network devices (113A, 113N) through one or more computing systems (e.g., 700, FIG. 7; a server, a user device, a host device, etc.) connected to the hub network device (113A, 113N).

In one or more embodiments, once one or more internal network services (114A, 114N) are assigned to a network traffic flow, all network traffic being transmitted using the network traffic flow may be sent to the assigned internal network services (114A, 114N). Subsequently, all return network traffic transmitted in response to the network traffic transmitted using the initial network traffic flow may be forwarded through the same internal network services (114A, 114N) assigned to the initial network traffic flow. This will be discussed in more detail below in reference to FIGS. 5A-5C and 6A-6D.

In one or more embodiments disclosed herein the external network services (115A, 115N) may be network services to be implemented on network traffic being transmitted to an outside the WAN (e.g., 100, FIG. 1A). For example, the external network services (115A, 115N) may be, but are not limited to, internet exit services (e.g., secure internet gateway (SIG), secure access secure edge (SASE), firewall(s) deployed in the WAN (100) before network traffic exits the WAN (100), local exit using NAT, etc.), software as a service (SaaS) (e.g., Office 365™, Box™, etc.), etc.

In one or more embodiments, external network services (115A, 115N) such as the internet exit services may be hosted by one or more of the hub network devices (113A, 113N) through one or more computing systems (e.g., 700, FIG. 7; a server, a user device, etc.) connected to the hub network device (113A, 113N). In other words, the hub network device (113A, 113N) hosting an internet exit service may serve as an exit point from the WAN (100) into other networks (e.g., private networks, other WANs set up by other entities, etc.). Additionally, external network services (115A, 115N) such as SAAS may be hosted on other network devices and/or computing systems that are located outside the WAN.

In one or more embodiments, once a network traffic has been serviced by one or more of the external network services (115A, 115N), the network traffic may re-enter the WAN through the same point from which it exited the WAN (e.g., through the same hub network device (113A, 113N) hosting the internet exit services that the network traffic used to exit the WAN). Alternatively, the network traffic may re-enter the WAN from a different point from which it exited the WAN.

In one or more embodiments, each of the internal network services (114A, 114N) and the external network services (115A, 115N) may include a service instance identifier (ID) for uniquely identifying each of the network services. For example, the service instance ID may be any form of identification (ID) (e.g., a serial number, a name, a tag, etc.) assigned by an administrator of a network (e.g., WAN (100), FIG. 1A) in which the network service resides.

In one or more embodiments disclosed herein, the network controller (117) is a physical or virtual device that may be used for performing various embodiments of the disclosure (see e.g., FIGS. 2A-3C). The physical device may correspond to any physical system (e.g., the computing system of FIG. 7) with functionality to implement the various embodiments of the disclosure. For example, the physical device may be a server (i.e., a device with at least one or more processor(s), memory, and an operating system) that is connected (e.g., directly connected or indirectly connected) via the network connected to the hub network devices (113A, 113N) and the branch network devices (111A, 111N) (through the hub network devices (113A, 113N).

Alternatively, the physical device may be a special purpose computing device that includes one or more application-specific processor(s) (or hardware) configured to only execute embodiments of the disclosure. In such cases, the physical device may implement embodiments of the disclosure in hardware as a family of circuits and may retain limited functionality to receive input and generate output in accordance with various embodiments of the disclosure. In addition, such computing devices may use a state-machine to implement various embodiments of the disclosure.

In another embodiment disclosed herein, the physical device may correspond to a computing device that includes one or more general purpose processor(s) and one or more application-specific processor(s) (or hardware). In such cases, one or more portions of the disclosure may be implemented using the operating system and general purpose processor(s), while one or more portions of the disclosure may be implemented using the application-specific processor(s) (or hardware).

As discussed above, in the context of the WAN (100) in FIG. 1A, each domain (101A, 101B) may include a single network controller (117). However, one or more embodiments disclosed herein is not limited to this configuration. For example, each domain (101A, 101B) may include multiple ones of the network controller (117) and each region (103A, 103B) with multiple sites (105A-105C) may also include one or more of the network controller (117). In general, the WAN (100) may include any number of network controllers (117) at any hierarchical level of the WAN (100) without departing from the scope of one or more embodiments disclosed herein as long as each network controller (117) is configured to control and/or monitor a group of network devices (e.g., the hub network devices (113A, 113N) and the branch network devices (111A, 111N).

Additional details of the network controller (117) are discussed below in reference to FIG. 1C.

In one or more embodiments disclosed herein, the network (118) may be the medium through which the branch network devices (111A, 111N), the hub network devices (113A, 113N), and the network controller (117) are connected within the WAN (100). In one embodiment of the disclosure, the network may include other network devices (or systems) (not shown) that facilitate communication between the aforementioned components. As such, in one embodiment of the disclosure, the network may include any combination of local (e.g., local area network (LAN) and/or WAN segments that may be wire-based and/or wireless and that may use any combination of wired and/or wireless communication protocols.

In one or more embodiments disclosed herein, the network (118) may include one or more service providers (SPs) (119A, 119N) that provide the branch network devices (111A, 111N), the hub network devices (113A, 113N), and the network controller (117) access to the network (118). For example, the service providers (119A, 119N) may be private (e.g., multiprotocol label switching (MPLS) providers) or public (e.g., internet service providers (ISPs)) service providers. The service providers (119A, 119N) are not limited to the aforementioned specific examples and may also include other types of service providers such as, for example, telecommunication service providers.

Figure 1C:
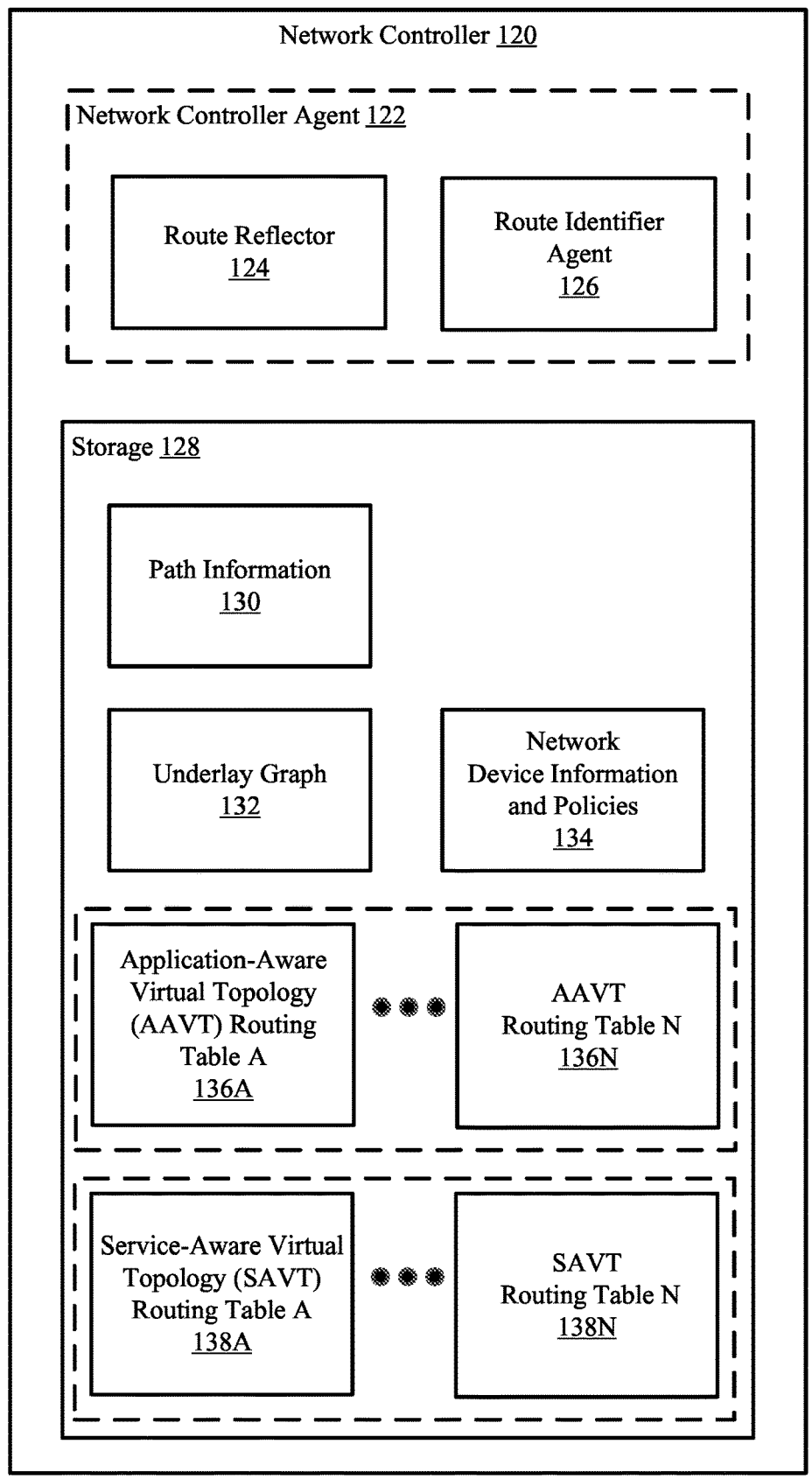
FIG. 1C shows a diagram of a network controller in accordance with one or more embodiments disclosed herein.

FIG. 1C shows an example network controller (120) in accordance with one or more embodiments of the disclosure. The network controller (120) may be the network controller (117) discussed above in reference to FIG. 1B. In addition to the components discussed above in reference to FIG. 1B, the network controller (120) further includes a route reflector (124), a route identifier agent (126), and a storage (128). The network controller (120) may include additional, fewer, and/or different components without departing from the disclosure. Each of the components illustrated in FIG. 1C is described below.

In one or more embodiments disclosed herein, the route reflector (124) may be configured in hardware (e.g., circuitry), software, or any combination thereof. The route reflector (124) uses border gateway protocol (BGP) techniques to learn about the paths between each device (e.g., the branch network devices (111A, 111N), the hub network devices (113A, 113N), and the controller (117)) within the network (e.g., 118, FIG. 1B). For example, each of the devices within the network is configured for BGP and a BGP session is established between each of the devices and the route reflector (124). Although the route reflector (124) is shown as being part of the network controller (120) in FIG. 1C, one of ordinary skill in the art would appreciate that one or more embodiments disclosed herein is not limited to such a configuration. For example, the route reflector (124) may be provided external to the network device (120) as a separate and independent component that is connected, (e.g., directly connected or indirectly connected) to the network controller (120).

In one or more embodiments disclosed herein, the route identifier agent (126) may be configured in hardware (e.g., circuitry), software, or any combination thereof. The route identifier agent (126) interacts with the other components (e.g., the route reflector (124) and storage (128)) of the network controller (120) to facilitate the implementation of one or more protocols, services, and/or features of the network controller (120). For example, the route identifier agent (126) may be used for performing one or more steps of processes in accordance with various embodiments of the disclosure (e.g., the processes discussed below in FIGS. 2C-2D) for generating a virtual topology for each of the network devices (e.g., the branch network devices (111A, 111N), the hub network devices (113A, 113N)) on the network. Additional details of the route identifier agent (126) are discussed below in FIGS. 2B-3C.

In one or more embodiments disclosed herein, when the route reflector (124) is included as part of the network controller (120), the combination of the route reflector (124) and the route identifier agent (126) is collectively referred to as the network controller agent (122). In such a configuration, the route reflector (124) and the route identifier agent (126) may be configured in hardware (e.g., circuitry), software, or any combination thereof as a single component within the network controller (120) that performs the functions of both the route reflector (124) and the route identifier agent (126).

In one or more embodiments disclosed herein, the storage (128) is implemented using devices that provide data storage services (e.g., storing data and providing copies of previously stored data). For example, storage (128) may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

In one or more embodiments disclosed herein, the storage (128) is configured to store at least path information (130), an underlay graph (132), network device information and policies (134), one or more AAVT routing tables (136A, 136N), and one or more service-aware virtual topology (SAVT) routing tables (138A, 138N) (which will be discussed in more detail below). Each of these components stored in the storage (128) is described below.

In one or more embodiments disclosed herein, the path information may include reachability information and path metrics. The path information (130) may be stored in the form of a data structure (e.g., a list, table, etc.). In one or more embodiments, the reachability information may include the paths between each of the network devices of the network discovered through BGP using the route reflector (124). Each of these paths making up the reachability information may be single virtual-hop paths. In the context of this disclosure, a single virtual-hop path constitutes a direct connection (through a service provider of the network) between a first network device to second network device without the need of going through a third network device. Said another way, using a single virtual-hop path, the first network device may send network traffic directly to the second network device without having to route the network traffic through the third network device. An example of a single virtual-hop path is shown below in FIG. 3C (e.g., path P1, FIG. 3C).

In one or more embodiments disclosed herein, the path metrics of the path information may include information specifying one or more properties of the path that reflects a quality of the path. For example, the path metrics may include, but are not limited to: latency, jitter, loss, total bandwidth, and current utilizations, etc. In one or more embodiments, the path metrics of each path in the network may be obtained using in-band (e.g., measured properties of a path are piggy backed on existing network traffics) and out-of-band techniques (e.g., synthetic probes with difference quality of service (QOS) marking for measuring latency, jitter, loss, etc.) and transmitted to the network controller using BGP. An example of a multiple virtual-hop path is shown below in FIG. 3C (e.g., path P2, FIG. 3C).

In one or more embodiments disclosed herein, the underlay graph (132) stored in the storage (128) may specify a path topology between the network devices (e.g., the branch network devices (111A, 111N), the hub network devices (113A, 113N), and the network controller (117)) connected on the network. The underlay graph (132) may be stored in the form of a pictorial graph and/or a data structure (e.g., a list, table, etc.). The path topology in the underlay graph (132) shows all of the connections between each of the network devices connected on the network, and further specifies the service provider that provides the connections. This allows multiple virtual-hop paths (i.e., paths made up of multiple single virtual-hop paths) to be discovered within the underlay graph (132).

As an example, assume that a hub network device is connected to two branch network devices (branch A and branch B). The hub network device is connected to branch B through the Internet, the hub network device is further connected to both branch A and branch B through MPLS, and branch A is connected to branch B through MPLS. A pictorial representation of this example connection is shown in the implementation example discussed below in reference to FIG. 3A. The underlay graph (132) for these three network devices may be a pictorial graph showing the three network devices with a line from the hub network device to branch B to show the Internet connection and another line from branch A to branch B showing the MPLS connection. A line also extends from the hub network device to each of branch A and branch B showing the MPLS connection. Such an underlay graph (132) shows that branch A may communicate with the hub network device using a single virtual-hop path through the MPLS connection or through a multiple virtual-hop path (using a combination of the MPLS and the Internet) by going through branch B. Although a specific example of the underlay graph (132) is provided above, one of ordinary skill in the art would appreciate that other variations (e.g., ones that use different line styles and line colors, ones illustrated in table format, etc.) of the underlay graph (132) are possible without departing from the scope of one or more embodiments as long as the underlay graph (132) accurately illustrates all of the connections between all of the network devices connected on the network.

In one or more embodiments, multiple ones of the underlay graph (132) may be stored in the storage (128). For example, assume that a network is an enterprise network divided into domains, regions, and sites. An underlay graph (132) may be generated for each layer of the enterprise network hierarchy.

In one or more embodiments disclosed herein, the network device information and policies (134) stored in the storage (128) may include information specifying a functionality of each of the network devices (e.g., the branch network devices (111A, 111N), the hub network devices (113A, 113N)). For example, network device information and policies (134) may include, but is not limited to, information specifying the applications to be executed by a network device, the network device's security policies (e.g., security policy preventing sensitive data from going over public networks), the network device's reachability requirements (e.g., information specifying how the network device restricts or limits communication with other network devices), whether the network device supports multiple virtual-hop (i.e., the network device's multiple virtual-hop metrics support), etc. In one or more embodiments, the network device information and policies (134) may be stored in the form of a data structure (e.g., a list, table, etc.).

In one or more embodiments disclosed herein, the AAVT routing table(s) (136A, 136N) stored in the storage (128) may include information (e.g., in the form of a routing table) specifying all possible paths between a network device among the network devices (e.g., the branch network devices (111A, 111N), the hub network devices (113A, 113N)) to another one of the network devices. In one or more embodiments, a path in the AAVT routing table (136A, 136N) may include the set of network devices and individual links (e.g., the specific ingress/egress port of a network device) connecting the network devices. In one or more embodiments, the path may comprise an ordered set of local links on each network device that the path traverses. An example of an AAVT routing table is shown below in reference to FIG. 4.

In one or more embodiments, the AAVT routing table(s) (136A, 136N) may also include usability information specifying which of the paths between a network device and another network device is best-suited for a particular application and/or policy (e.g., based on the network device information and policies (134) of the network device) to be executed by the network device. This advantageously prioritizes the constraints of each path between the network devices to leverage all of the service provider connections for delivering the best application performance at the lowest cost.

In one or more embodiments, the AAVT routing table(s) (136A, 136N) may be configured to include information regarding network services (e.g., internal network services (e.g., 114A, 114N, FIG. 1B) and external network services (e.g., 115A, 115N, FIG. 1B)). The information regarding the network services may include, but are not limited to, the service instance ID of a network service, a location of the network service (e.g., the network device hosting the network service), a brief description of the network service, a service health of each service (e.g., connectivity quality, latency, bandwidth jitter and loss-rate, etc.), etc. This information regarding the network services may be collected along with the above-discussed path information and network device information and policies, and relayed to the network controller (120) (e.g., using BGP) along with this other information. In one or more embodiments, this information regarding the network services may also be used to build the above-discussed underlay graph. More specifically, the underlay graph (partially shown through the connections between the devices shown in FIG. 6A) will now include additional lines connecting network devices (e.g., the hub network devices and the branch network devices) to one or more services that the network devices are hosting.

In the context of one or more embodiments disclosed herein, AAVT routing tables (136A, 136N) that are configured to include the information regarding network services will be referred to herein as "service-aware virtual topology (SAVT) routing tables" (138A, 138N). In an SAVT routing table (138A, 138N), the above-discussed usability information will not only specify the paths between a network device and another network device that is best-suited for a particular application and/or policy to be executed by the network device but also specify the best-suited network service for servicing network traffic associated with the particular application and/or policy. More specifically, for a network traffic associated with a particular application and/or policy, the SAVT routing table may specify for a network device at which the network traffic originated: (i) the best-suited network service(s) to be implemented on the network traffic; and (ii) the best-suited path(s) for reaching the best-suited network service from the network device. An example of such a configuration will be described in more detail below in reference to FIGS. 6A-6D.

In one or more embodiments, an AAVT routing table (136A, 136N) (or an SAVT routing table (138A, 138N)) is generated (e.g., by the route identifier agent) for each of the network devices connected on the network. The AAVT routing tables (136A, 136N) (or the SAVT routing tables (138A, 138N)) may be stored in the form of a data structure (e.g., a list, table, etc.).

Although FIG. 1C is described using BGP as a specific example, one of ordinary skill in the art would appreciate that other network techniques that are able to retrieve information equivalent to the path information (130) may be utilized without departing from the scope of one or more embodiments described herein.

Figure 1D:
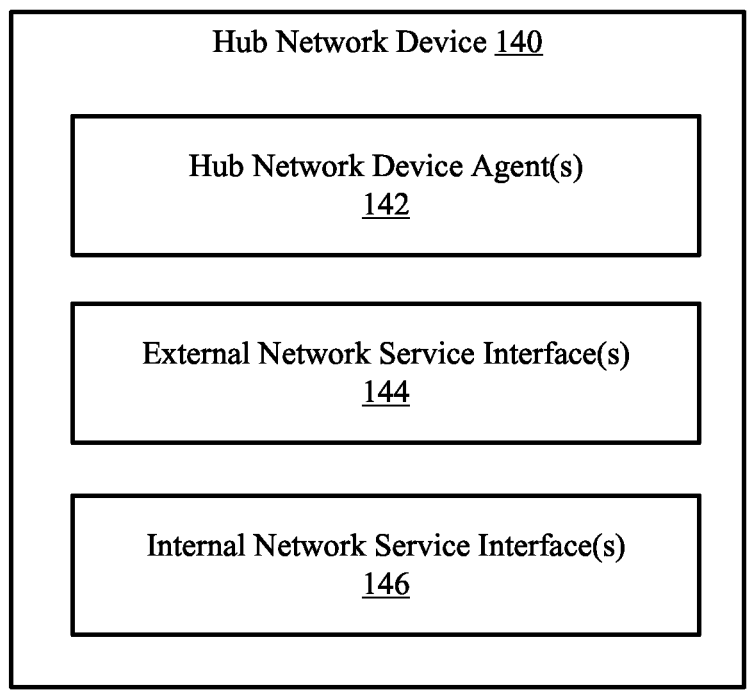
FIG. 1D shows a diagram of a hub network device in accordance with one or more embodiments disclosed herein.

FIG. 1D shows a hub network device (140) in accordance with one or more embodiments of the disclosure. The hub network device (140) may be any one of the hub network devices (113A, 113N) discussed above in reference to FIG. 1B. In addition to the components discussed above in reference to FIG. 1B, the hub network device (140) further includes one or more hub network device agents (142), one or more external network service interfaces (144), and one or more internal network service interfaces (146). The hub network device (140) may include additional, fewer, and/or different components without departing from the disclosure. Each of the components illustrated in FIG. 1D is described below.

In one or more embodiments disclosed herein, the hub network device agent(s) (142) interacts with the other components of the hub network device (140) (e.g., a processor (not shown), memory (not shown), etc.). Each hub network device agent (142) facilitates the implementation of one or more protocols, services, and/or features of the hub network device (140). Examples of hub network device agents (140), include, but are not limited to, a bug-alerts agent, a policy agent that manages access control lists, a user interface agent, a routing information base agent, a forwarding information base agent, and a simple network management protocol (SNMP) agent. In one or more embodiments, the one or more embodiments of the hub network device agents (142) interact with the other components of the hub network device (140) to forward network traffic to one or more network services (e.g., internal network services (e.g., 114A, 114N, FIG. 1B) and external network services (e.g., 115A, 115N, FIG. 1B)) hosted by the hub network device (140). As discussed above in reference to FIG. 1B, the network services are hosted by the hub network device (140) through one or more computing systems (e.g., 700, FIG. 7; a server, a user device, a host device, etc.) connected to the hub network device (140).

In one or more embodiments, the external network service interfaces (144) may be physical interfaces (e.g., ports) (or virtual instances thereof) of the hub network device (140)

connected to the one or more computing systems that are executing one or more of the external network services (e.g., 115A, 115N, FIG. 1B)). For example, the external network service interface (144) may be a physical port connecting the hub network device (140) to a computing system outside of the WAN (e.g., 100, FIG. 1A) executing a SAAS. Additionally, the external network service interfaces (144) may be configured to connect the hub network device (140) to a computing system within the WAN that is executing an internet exit service that allows network traffic to exit the WAN.

In one or more embodiments, the internal network service interfaces (146) may be physical interfaces (e.g., ports) (or virtual instances thereof) of the hub network device (140) connected to the one or more computing systems that are executing one or more of the internal network services (e.g., 114A, 114N, FIG. 1B)). For example, the internal network service interface (144) may be a physical port connecting the hub network device (140) to a computing system within the WAN that is executing a NGFW service.

Figure 1E:
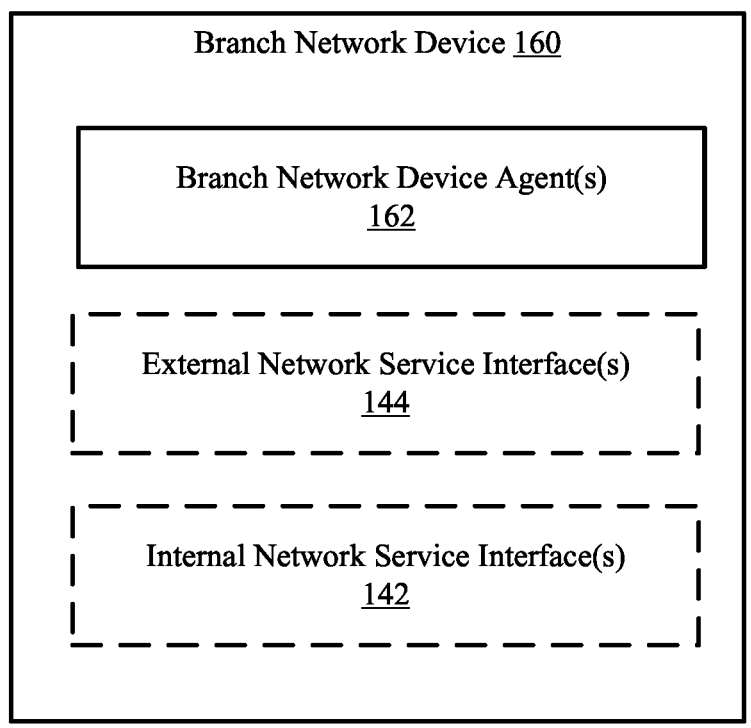
FIG. 1E shows a diagram of a branch network device in accordance with one or more embodiments disclosed herein.

FIG. 1E shows a branch network device (160) in accordance with one or more embodiments of the disclosure. The branch network device (160) may be any one of the branch network devices (111A, 111N) discussed above in reference to FIG. 1B. In addition to the components discussed above in reference to FIG. 1B, the branch network device (160) further includes at least one or more branch network device agents (162). The branch network device (160) may include additional, fewer, and/or different components without departing from the disclosure. For example, in one or more embodiments, the branch network device (160) may be configured to include the external network service interface (144) and the internal network service interface (146) of the hub network device (140) discussed above in reference to FIG. 1D. Alternatively, the branch network device (160), may be configured without the interfaces (e.g., 144 and 146, FIG. 1D) such that network services are only hosted by the hub network device (140). The branch network device agent(s) (162) illustrated in FIG. 1E is described below.

In one or more embodiments disclosed herein, the branch network device agent(s) (162) interacts with the other components of the branch network device (160) (e.g., a processor (not shown), memory (not shown), etc.). Each branch network device agent(s) (162) facilitates the implementation of one or more protocols, services, and/or features of the branch network device (160). Examples of branch network device agent (162), include, but are not limited to, a bug-alerts agent, a policy agent that manages access control lists, a user interface agent, a routing information base agent, a forwarding information base agent, and a simple network management protocol (SNMP) agent. In one or more embodiments, if the branch network device (160) is configured to include the interfaces (e.g., 144 and 146, FIG. 1C), the branch network device agents (162) interact with the other components of the branch network device (160) to forward network traffic to one or more network services similar to that as discussed above in reference to FIG. 1D.

Furthermore, one skilled in the art will recognize that the architecture of the system (110), of the network controller (120), the network (118), the hub network device (140), and of the branch network device (160) is not limited to the components shown in FIGS. 1B and 1C. For example, the network may include any number and any type of network devices participating in the sharing of data. Further, the network controller (120) may include components (e.g., a processor) not shown in FIG. 1C.

Figure 2A:
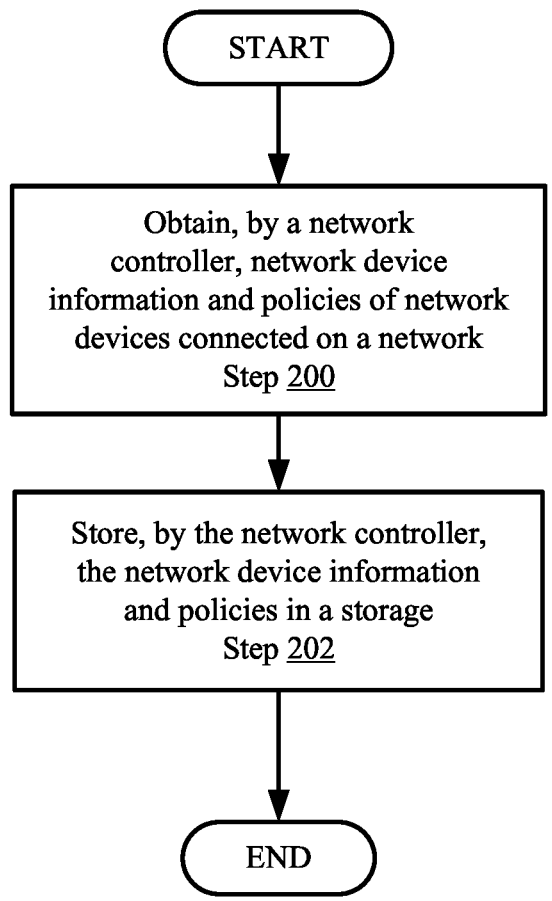
FIG. 2A shows a flowchart in accordance with one or more embodiments described herein.

FIG. 2A shows a flowchart of a method in accordance with one or more embodiments of the disclosure. The method depicted in FIG. 2A may be performed to configure a network controller (e.g., 117, FIG. 1B; 120, FIG. 1C) with the network device information and policies of each network device (e.g., the branch network devices (111A, 111N), the hub network devices (113A, 113N)) connected on the network. The method shown in FIG. 2A may be performed by, for example, the network controller agent (e.g., 122, FIG. 1C) of the network controller. Other components of the systems in FIGS. 1B-1E may perform all, or a portion, of the method of FIG. 2A without departing from the scope of this disclosure.

While FIG. 2A is illustrated as a series of steps, any of the steps may be omitted, performed in a different order, additional steps may be included, and/or any or all of the steps may be performed in a parallel and/or partially overlapping manner without departing from the disclosure.

In Step 200, the network controller obtains network device information and policies (e.g., 134, FIG. 1C) of each network device (e.g., the branch network devices (111A, 111N), the hub network devices (113A, 113N)) connected on the network. In one or more embodiments, the network device information and policies of each branch network device (e.g., 111A-111N, FIG. 1B) may first be transmitted to a hub network device (e.g., 113A-113N, FIG. 1B) in charge of the branch network devices. The hub network device aggregates all of the received network device information and policies with its own network device information and policies to obtain an aggregated network device information and policies. The aggregated network device information and policies is then transmitted by the hub network device to the network controller.

In Step 202, after obtaining the network device information and policies, the network controller stores the obtained network device information and policies in a storage (e.g., 128, FIG. 1C). In one or more embodiments, the network device information and policies obtained by the network controller will subsequently be used during the generation of the AAVT routing tables (e.g., 136A-136N, FIG. 1C), which is described in more detail below in reference to FIGS. 2B-2D.

Figure 2B:
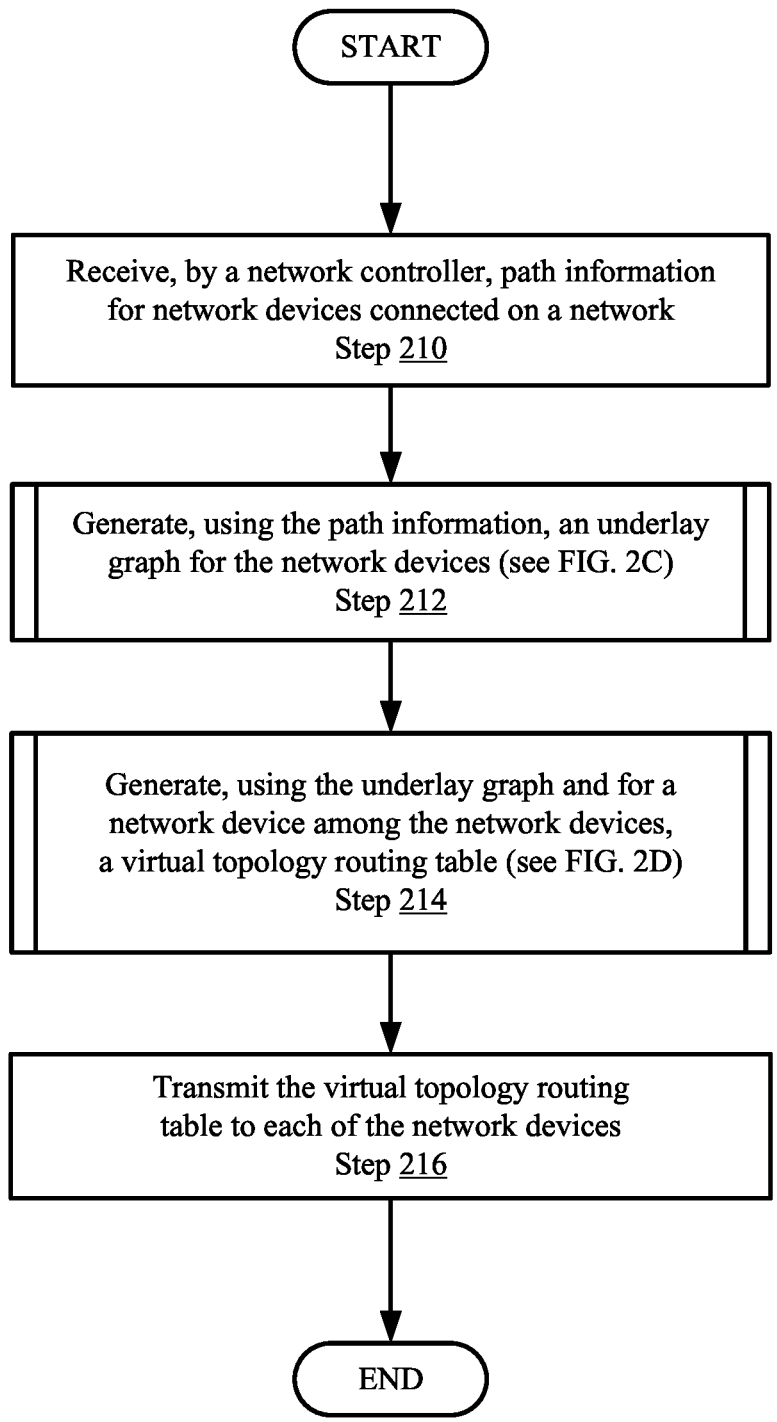
FIGS. 2B-2D show flowcharts describing a method for generating virtual topologies in accordance with one or more embodiments described herein.
Figure 2C:
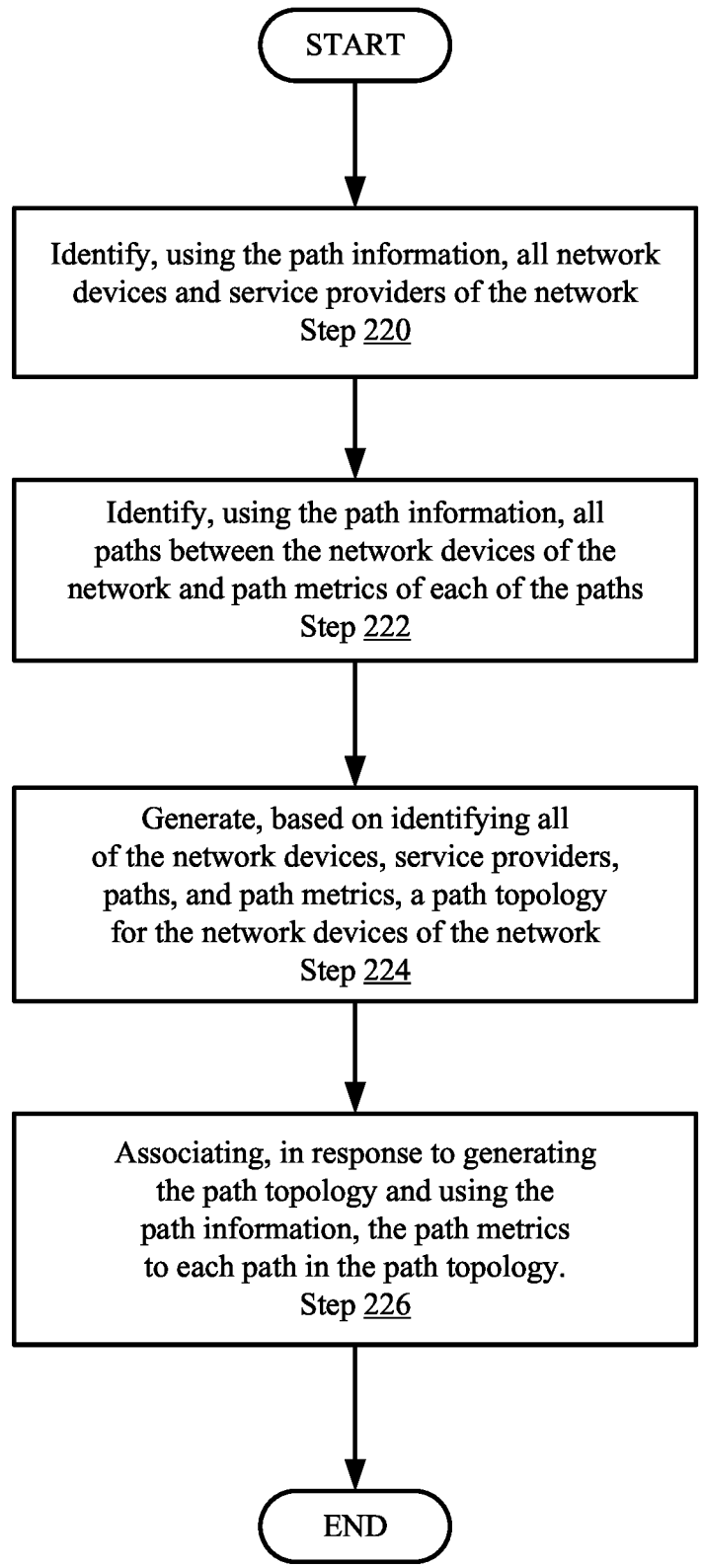
Figure 2D:
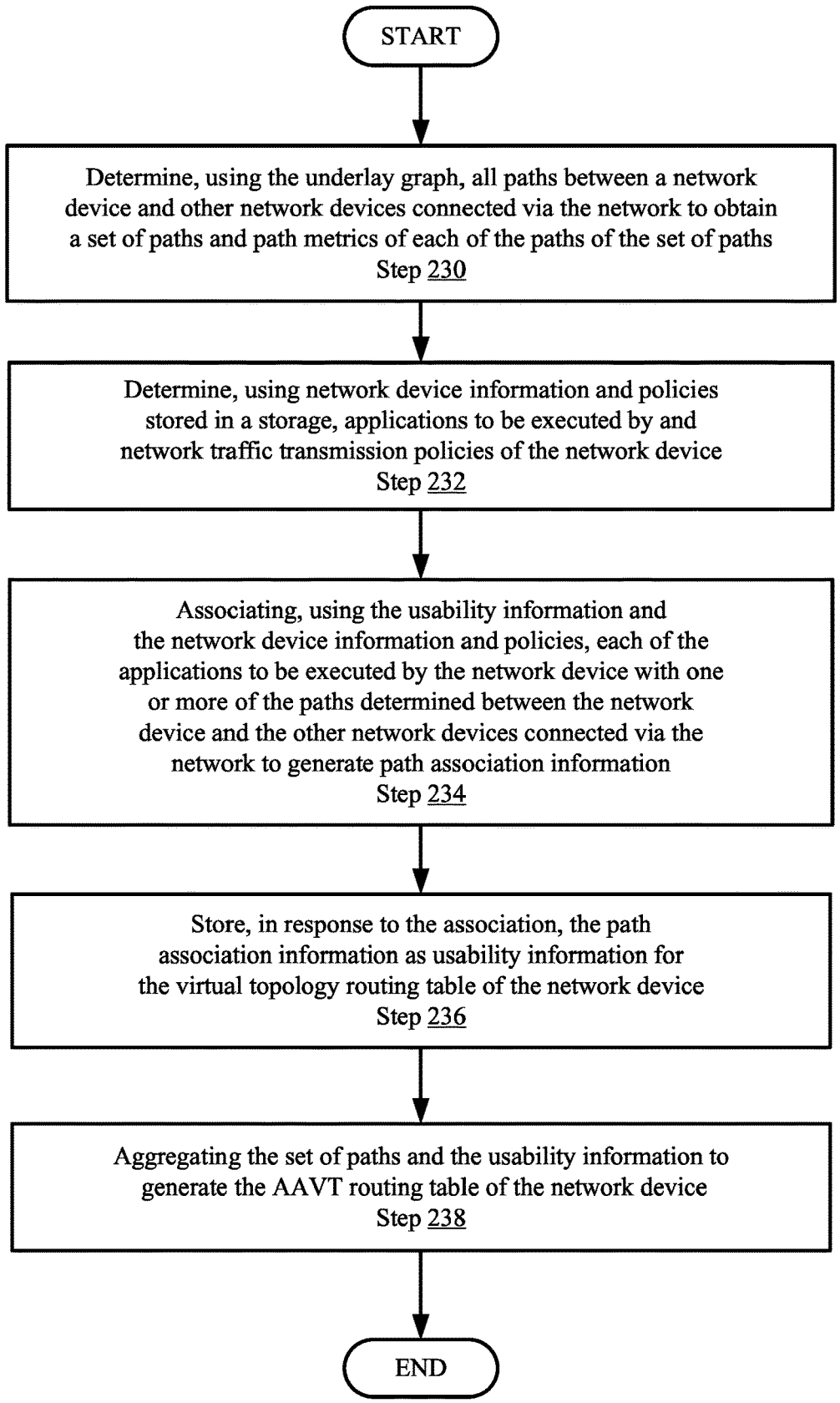

FIGS. 2B-2D show flowcharts of a method in accordance with one or more embodiments of the disclosure. The method depicted in FIGS. 2B-2D may be performed to generate an AAVT routing table for each network device (e.g., the branch network devices (111A, 111N), the hub network devices (113A, 113N)) connected on the network. The method shown in FIGS. 2B-2D may be performed by, for example, the network controller agent (e.g., 122, FIG. 1C) of the network controller. Other components of the systems in FIGS. 1B-1C may perform all, or a portion, of the method of FIGS. 2B-2D without departing from the scope of this disclosure.

While FIGS. 2B-2D are illustrated as a series of steps, any of the steps may be omitted, performed in a different order, additional steps may be included, and/or any or all of the steps may be performed in a parallel and/or partially overlapping manner without departing from the disclosure.

Starting with FIG. 2B, in Step 210, the network controller receives path information (e.g., 130, FIG. 1C) for network devices connected on a network. In one or more embodiments, the path information may be retrieved by the route reflector (e.g., 124, FIG. 1C) of the network controller agent using, for example, BGP techniques. Additionally, each of the branch network devices may first transmit their respective path information (discovered through, for example, BGP sessions between one another) to a hub network device. The hub network device may aggregate all of the received path information into an aggregated path information database, and subsequently transmits the aggregated path information to the network controller through, for example, a BGP session.

In Step 212, the network controller uses the path information received in Step 210 to generate an underlay graph (e.g., 132) for the network devices. In one or more embodiments, in the event that the network controller includes the route reflector, the path information is relayed from the route reflector to the route identifier agent (e.g., 126, FIG. 1C). The route identifier agent then uses the reachability information included in the path information to generate the underlay graph. Additional details of Step 212 with respect to generating the underlay graph are described below in the flowchart of FIG. 2C.

In Step 214, using the underlay graph generated in Step 212, the network controller generates an AAVT routing table for each of the network devices (e.g., the branch network devices (111A, 111N), the hub network devices (113A, 113N)) connected to the network. This process is described in more detail below in the flowchart of FIG. 2D.

In Step 216, the network controller transmits the AAVT routing tables to each of the respective network devices connected to the network. In one or more embodiments, the network controller may transmit the AAVT routing tables through the route reflector.

In one or more embodiments, the network controller may also transmit instructions for each network device to program all of the paths included in each of the respective AAVT routing tables. The paths to be programmed in each network device may depend on the network device information and policies. For example, assume that a network device includes network device information and policies specifying that all network traffic must pass through a firewall service within the network. All single virtual-hop and multiple virtual-hop paths in the AAVT routing table that do not traverse the firewall service will not be programmed into the network device. As another example, assume that the network is an enterprise network and the enterprise network is configured such that inter-region network traffic can only be received and transmitted through the hub network device. Said another way, a branch network device A of one region can only send network traffic to a branch network device B of another region by going through the hub network devices of the two regions. For communications between branch network device A and branch network device B, only paths that go through the hub network devices will be programmed in branch network devices A and B.

In one or more embodiments, the network controller may program a network device (through the instructions sent with the AAVT routing table) using, for example, a stack of paths (e.g., virtual paths representing a connection using a virtual tunnel link between two network devices) representing a trajectory of the packet through the network to optimize the path(s) utilized by the network device for specific network traffic. An example of the stack of paths (also referred to herein as a "hop stack" or "hop stack information") is shown below in reference to FIG. 4. Another example of configuring the hop stack is shown below in reference to FIG. 6E. Other methods of programming a network device to use the paths included in the AAVT routing tables may also be used without departing from the scope of this disclosure.

Turning now to FIG. 2C, in Step 220, the network controller uses the path information obtained in Step 210 of FIG. 2B to identify all network devices and service providers of the network. In one or more embodiments, all of the branch network devices, the hub network devices, and the service providers connecting the branch network devices and the hub network devices are identified using the path information.

In Step 222, all paths between the network devices identified in Step 220 are identified using the path information (namely, the reachability information included in the path information). The path information is also parsed to identify (i.e., obtain) the path metrics of each of the identified paths.

In Step 224, once all of the network devices, service providers, paths, and path metrics are identified in Steps 220 and 222, the network controller uses all of the obtained information to generate a path topology for the network devices connected to the network. In one or more embodiments, as discussed above in reference to FIG. 1C, the underlay graph is generated using and includes all of the paths (including all single virtual-hop and multiple virtual-hop paths) between each of the network devices connected to the network. Alternatively, in one or more embodiments, the underlay graph may be generated to include only multiple virtual-hop paths between the network devices (i.e., all single virtual-hop paths that do not make up part of a multiple virtual-hop path are excluded from the path topology). Examples of multiple virtual-hop and single virtual-hop paths are shown in FIGS. 3A-3C. This may be done, for example, in the above-discussed example where a network is configured such that inter-region network traffic can only be received and transmitted through the hub network device.

In Step 226, once the path topology is generated, the network controller associates each path metrics identified in Step 222 with each of the paths included in the path topology. The underlay graph is generated (in Step 226) (e.g., once the association of the path metrics with each of the paths included in the path topology is completed) based on this path topology.

Turning now to FIG. 2D, in Step 230, the network controller uses the underlay graph generated in Step 212 of FIG. 2B to determine (i.e., identify) all paths between a network device (e.g., a branch network device) and all other network devices connected via the network. In one or more embodiments, all of the identified paths are stored as a set of paths for the AAVT routing table of the network device. In Step 230, the path metrics of each of the paths in the set of the paths are also identified.

In Step 232, the network controller uses the network information and policies of the network device (obtained in Step 200 of FIG. 2A) to determine all applications (e.g., voice applications, video applications, streaming applications, etc.) to be executed by the network device. The network controller also uses the network information and policies of the network device to determine network traffic transmission policies of the network device.

In Step 234, the information obtained in Steps 230 and 232 are associated with one another to generate path association information. In one or more embodiments, the path association information may be obtained by associating one or more of the applications and/or policies to be executed by the network device to one or more of the paths in the set of paths.

For example, in one or more embodiments, the network controller may make a first determination that the network device executes voice applications (e.g., voice calls through web communication applications). The network controller may then make a second determination, based on the set of paths and the path metrics, that one of the paths among the set of paths has the least jitter and is best suited for the voice applications. As part of the second determination, the network controller may also determine that the best-suited path is a multiple virtual-hop path. In response, the network controller makes a third determination based on the network traffic transmission policies of the network device that the network device supports network traffic transmission using multiple virtual-hop paths. As a result, the voice applications of the network device are now associated with this multiple virtual-hop path among the set of paths that has the least jitter.

In Step 236, the network controller may store the path association information in the storage as the usability information to be included in the AAVT routing table of the network device. Furthermore, in response to obtaining the set of paths and the usability information, the network controller aggregates (in Step 238) these two information into the AAVT routing table of the network device.

In one or more embodiments disclosed herein, the AAVT routing table of the network device generated in Step 238 may include all of the paths within the set of paths. Alternatively, in one or more embodiments, based on the path metrics and the network information and policies information, the network controller may filter down the set of paths to a predetermined number (e.g., two (2)) of best-suited paths for the network device to utilize. The AAVT routing table generated will then only include the predetermined number of best-suited paths.

In one or more embodiments, the information regarding network services (as discussed above in reference to FIG. 1C) may also be aggregated (in STEP 238) into the AAVT routing tables to generate an SAVT for the network device.

In one or more embodiments disclosed herein, the process in the flowchart of FIG. 2D is repeated for each of the network devices connected on the network. Additionally, because the network is constantly changing, the network controller may be configured to dynamically generate a new AAVT routing table for each of the network devices after a predetermined amount of time has elapsed since the generation of the previous AAVT routing table.

Figure 3A:
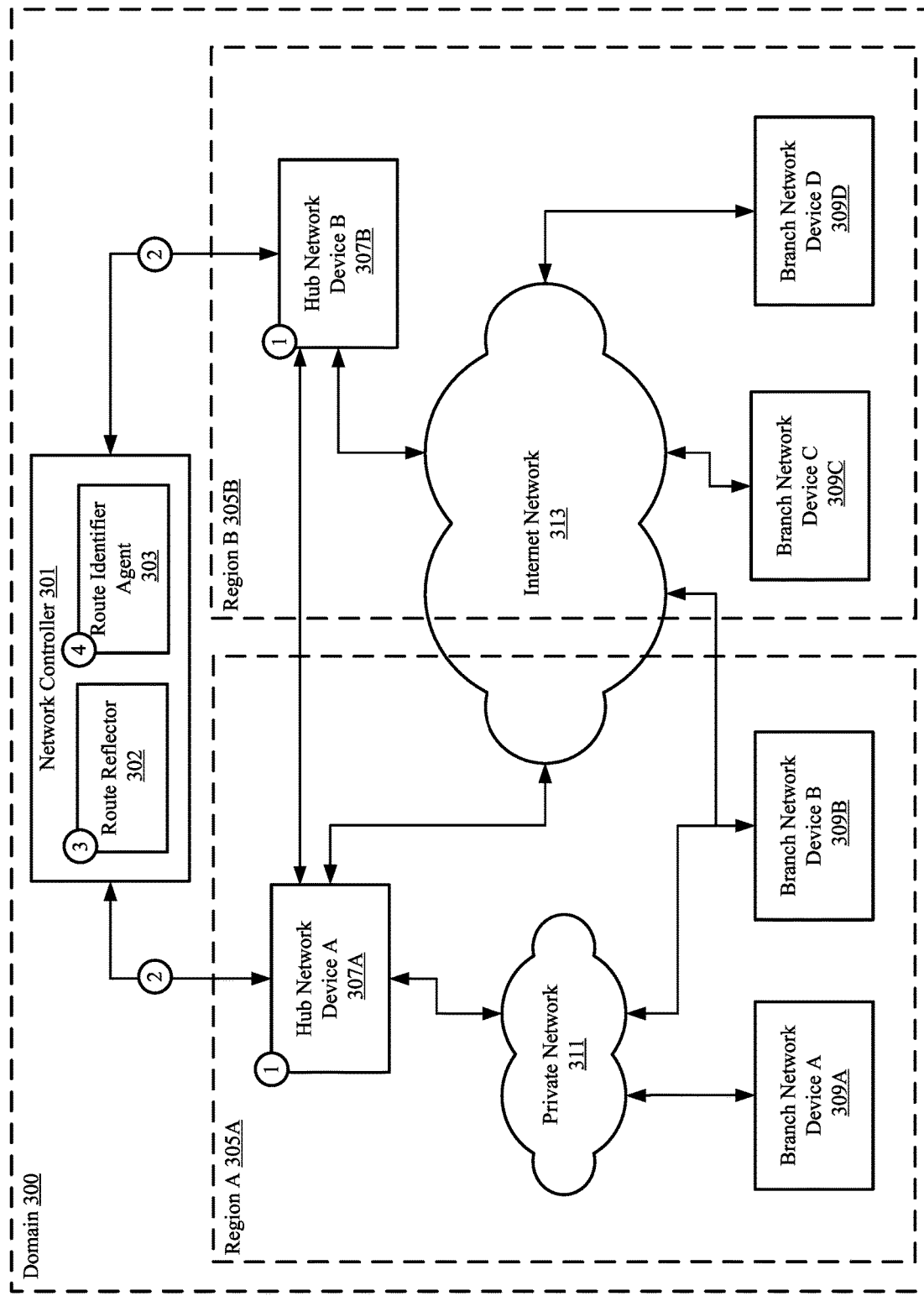
FIGS. 3A-3C show an example in accordance with one or more embodiments described herein.
Figure 3B:
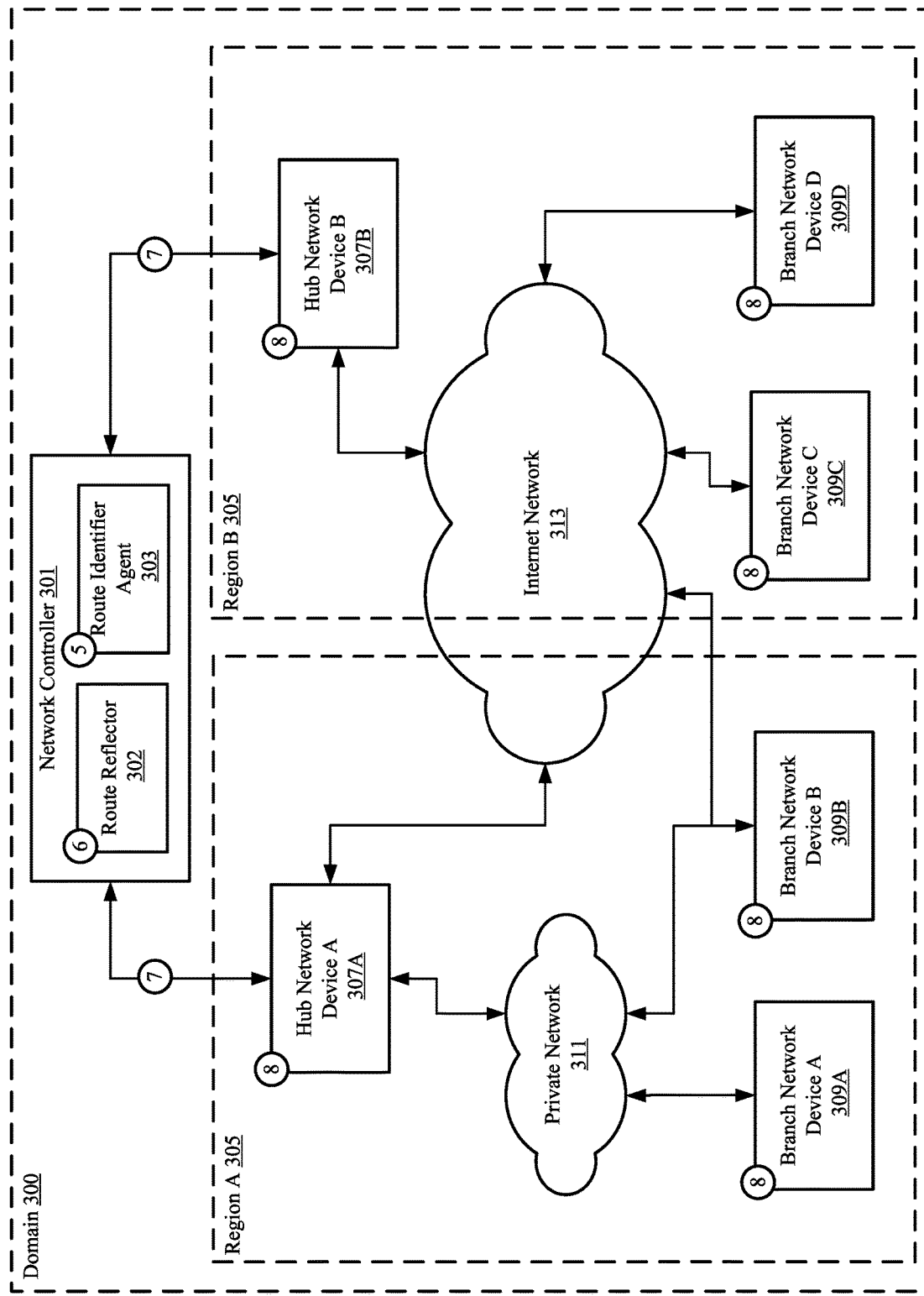
Figure 3C:
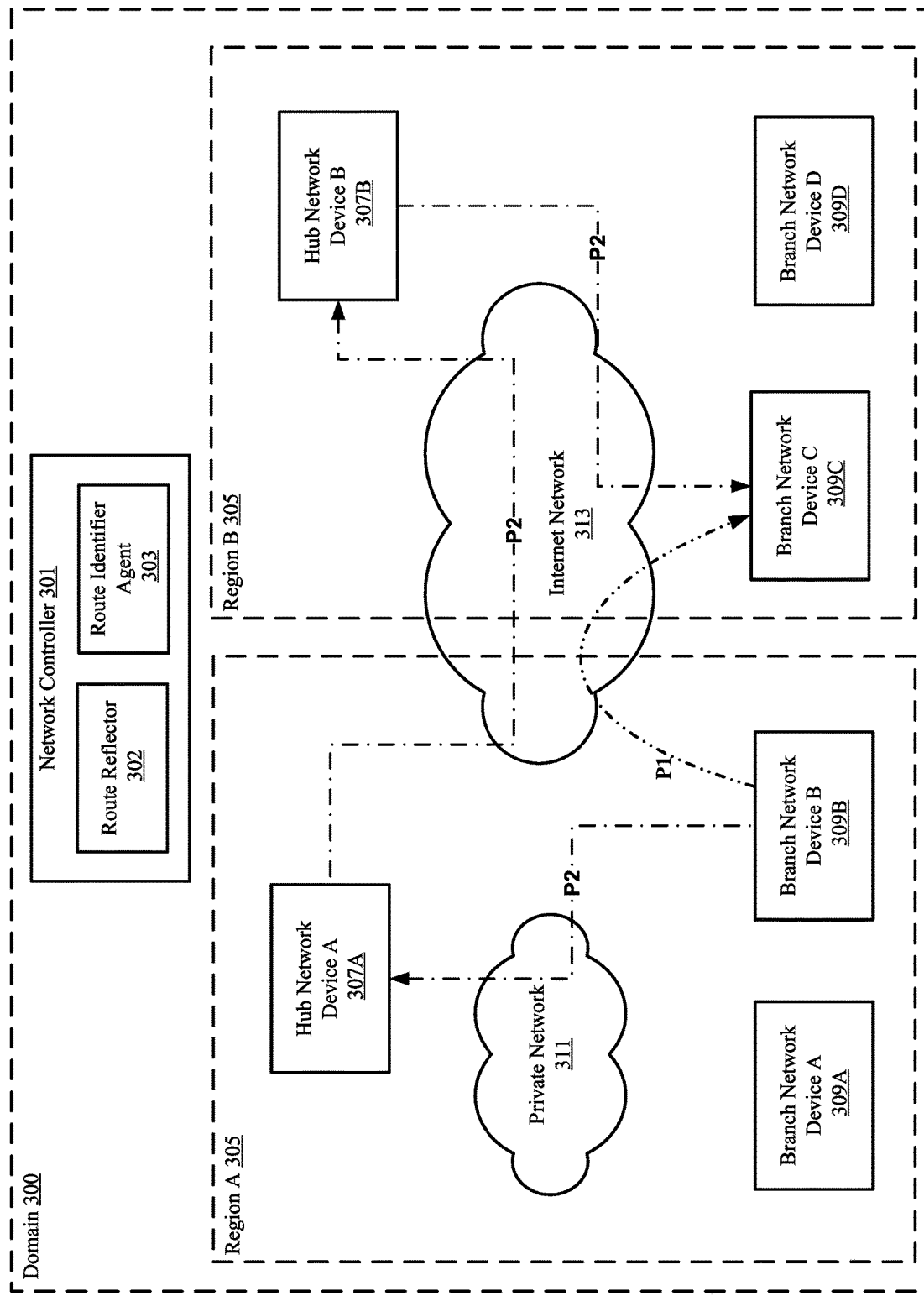

To further clarify embodiments of the disclosure, an example is provided in FIGS. 3A-3C. The numbers in the brackets below, e.g., "[1]", correspond to the same circled numbers in FIGS. 3A-3C.

Start of Example

Initially, assume that a WAN (e.g., 100, FIG. 1A) has a domain (300) with a topology shown in FIG. 3A. Further assume that the domain (300) is configured to include a single network controller (301) that is in charge of generating a AAVT for each of the network devices in the domain (300). To generate an AAVT for each network device in domain (300), first, hub network device A (307A) and hub network device B (307B) receive path information from branch network devices (309A-309D) of their respective regions (i.e., region A (305A) and region B (305B) and aggregates the path information into aggregated path information databases [1]. The aggregated path information databases are transmitted to the network controller (301) [2]. The aggregated path information databases are received by the route reflector (302) and transmitted to the route identifier agent (303) [3]. The route identifier agent (303) uses the aggregated path information databases to generate an AAVT routing table for each of the branch network devices (309A-309D) and each of the hub network devices (307A and 307B) [4].

Turning now to FIG. 3B, after the AAVT routing tables are generated, the route identifier agent (303) provides the AAVT routing tables to the route reflector (302) [5]. The route reflector (302) receives the AAVT routing tables from the route identifier agent (303) [6]. The route reflector (302) transmits (or otherwise provides) the AAVT routing tables to each of the branch network devices (309A-309D) and each of the hub network devices (307A and 307B) [7]. Upon receiving the AAVT routing tables, each of the branch network devices (309A-309D) and each of the hub network devices (307A and 307B) programs paths identified in their respective AAVT routing tables [8].

Finally, as seen in FIG. 3C, after receiving the AAVT routing table, branch network device B (309B) installs two different paths to reach branch network device C (309C): (i) path P1 as a direct single virtual-hop path using internet network (313); and (ii) path P2 as a multiple virtual-hop path through hub network device A and hub network device B (307A and 307B) utilizing internet network (313). The AAVT routing table will also provide branch network device B (309B) with information regarding which of the two paths (e.g., path P1 and path P2) are best suited for specific applications and/or for specific network traffic transmission policies to be executed by branch network device B (309B).

End of Example

Figure 4:
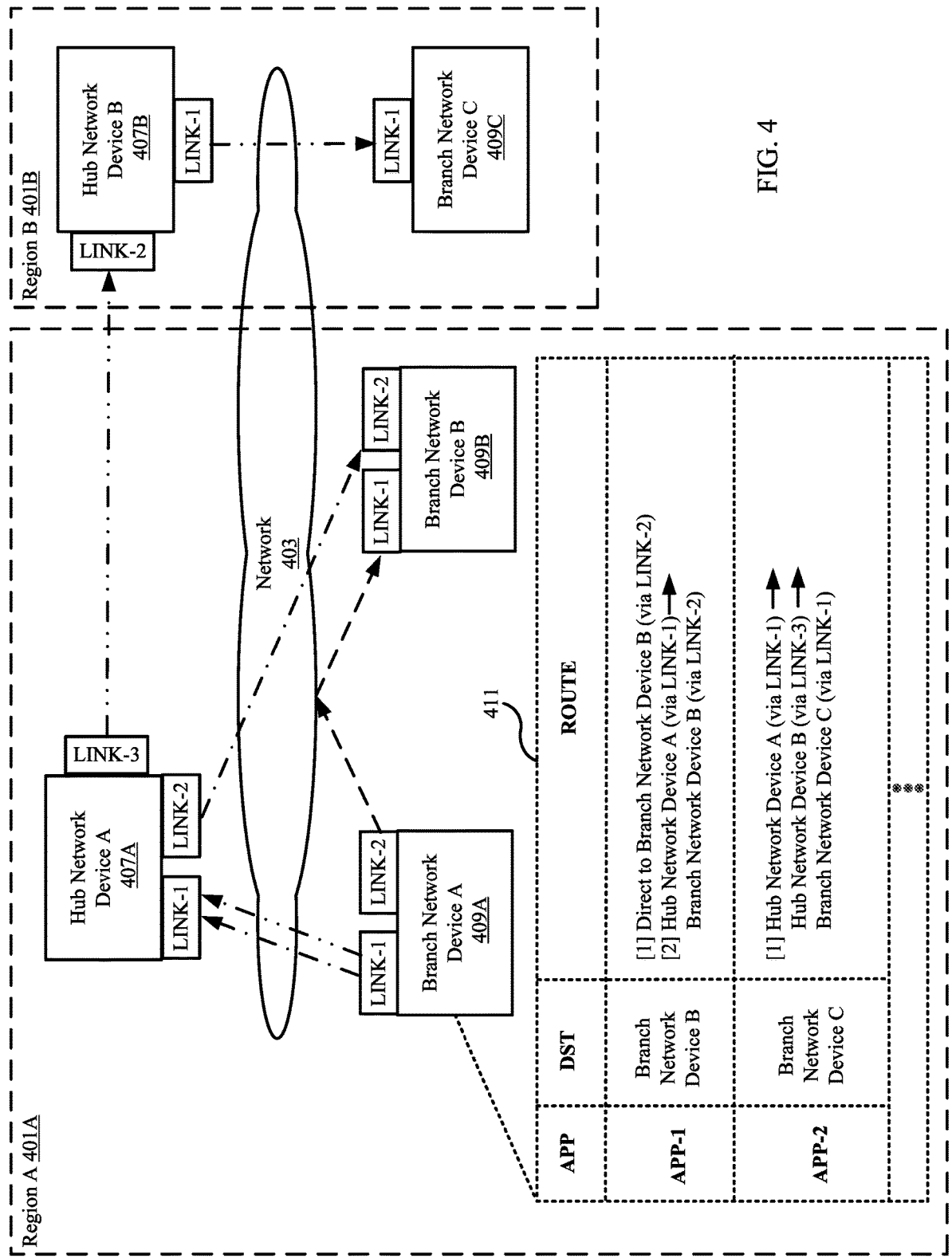
FIG. 4 shows an example in accordance with one or more embodiments described herein.

To further clarify embodiments of the disclosure, another example is provided in FIG. 4.

Start of Example

Initially, as shown in FIG. 4, assume that a WAN (e.g., 100, FIG. 1A) includes two regions (e.g., 103A-103B, FIG. 1A), region A (401A) and region B (401B), that are connected by a network (403) (e.g., 118, FIG. 1B). Region A (401A) includes a hub network device A (407A) (e.g., 113A-113N, FIG. 1B), a branch network device A (409A) (e.g., 111A-111N, FIG. 1B), and a branch network device B (409B). Region B (401B) includes a hub network device B (407B) and a branch network device C (409C). Each network device shown in FIG. 4 includes links (e.g., LINK-1, LINK-2, etc.) representing a connection at an ingress/egress port of the device.

As shown in FIG. 4, branch network device A (at any given point in time) receives an application-aware virtual topology (AAVT) routing table (411) from a network controller (not shown) (e.g., 117, FIG. 1B, 301 of FIG. 3A). The AAVT routing table (411) includes entries representing (from left to right of the table): (i) an application classification column, (ii) a destination column, and (iii) a route column.

The application classification column (APP) specifies a classification of an application (referred to below as "application classification") associated with network traffic to be transmitted by branch network device A (409A). For example, APP-1 in the AAVT routing table (411) may represent a voice application while APP-2 may represent a video application. The destination column (DST) specifies a transmission destination for each network traffic. The route column specifies routes (e.g., routes represented by single virtual-hop paths and multiple virtual-hop paths) with path characteristics that are best suited for transmitting network traffic associated with each application classification. The route column specifies these routes as a stack of paths (discussed above in reference to FIG. 2B) while also specifying the specific link (e.g., LINK-1, LINK-2, etc.) of each network device used for transmitting network traffic associated with each application classification.

As one example shown in FIG. 4, the first entry of the AAVT routing table (411) specifies that network traffic associated with application classification APP-1 has two possible routes (e.g., [1] and [2]) for reaching branch network device B (409B). The first route [1] (represented by the broken line with only dashes) is a direct transmission (e.g., a single virtual-hop path) to branch network device B (409B) originating from LINK-2 of branch network device A (409A). The second route [2] (represented using the dot-dash-dot broken line) is a multiple virtual-hop path first from LINK-1 of branch network device A (409A) to hub network device A (407A) and then from LINK-2 of hub network device A (407A) to the destination branch network device B (409B).

As another example shown in FIG. 4, the second entry of the AAVT routing table (411) specifies that network traffic associated with application classification APP-2 has only a single option (e.g., route [1] of the second entry) for reaching branch network device C (409C) in region B (401B). This route [1] of the second entry for network traffic associated with APP-2 (represented using the dot-dot-dash broken line) is a multiple virtual-hop path that: originates from LINK-1 of branch network device A (409A) to hub network device A (407A), gets forwarded via LINK-3 of hub network device A (407A) to hub network device B (407B), and finally transmitted via LINK-1 of hub network device B (407B) to destination branch network device C (409C).

End of Example

Figure 5A:
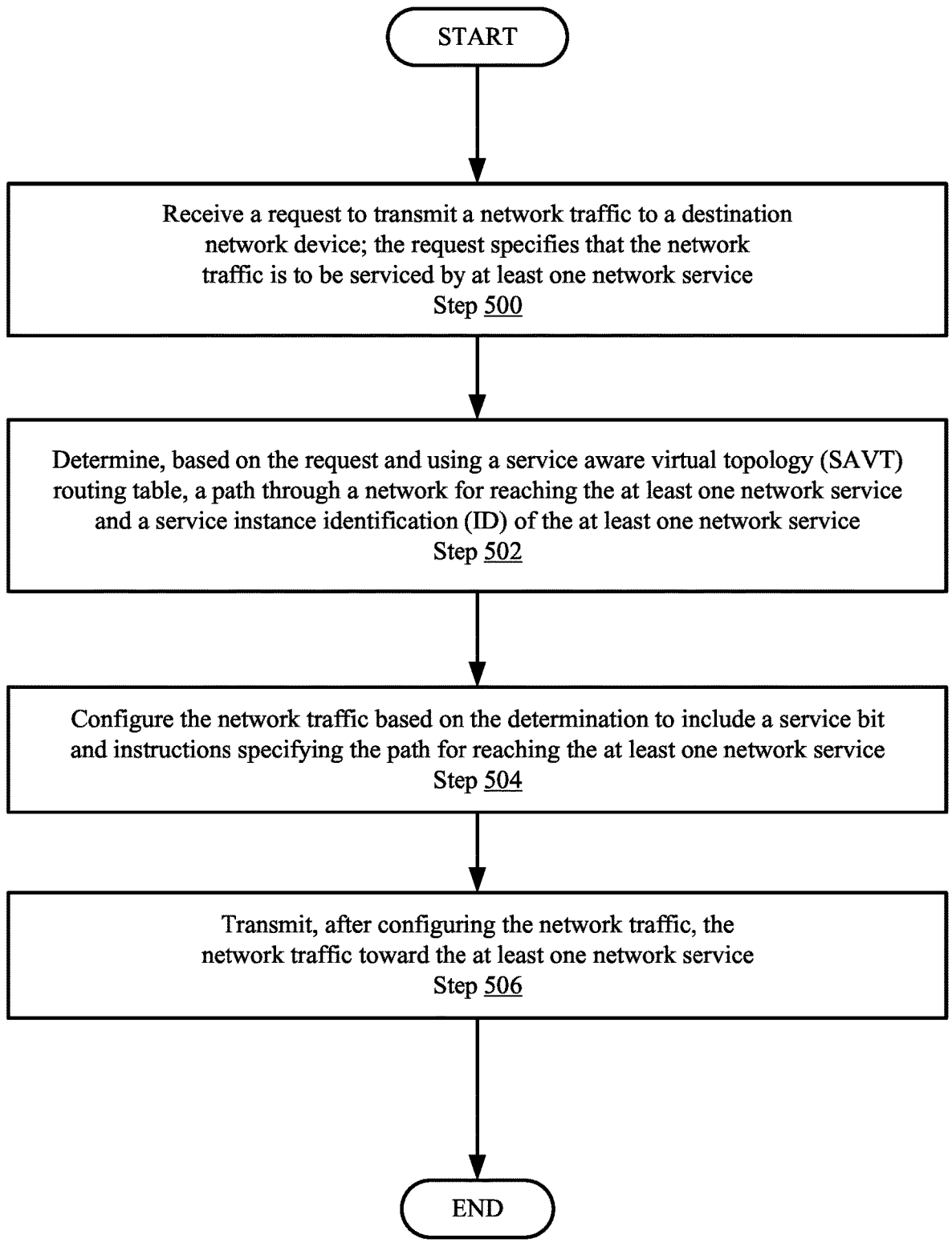
FIGS. 5A-5C show flowcharts describing a method for servicing network traffic in accordance with one or more embodiments described herein.
Figure 5B:
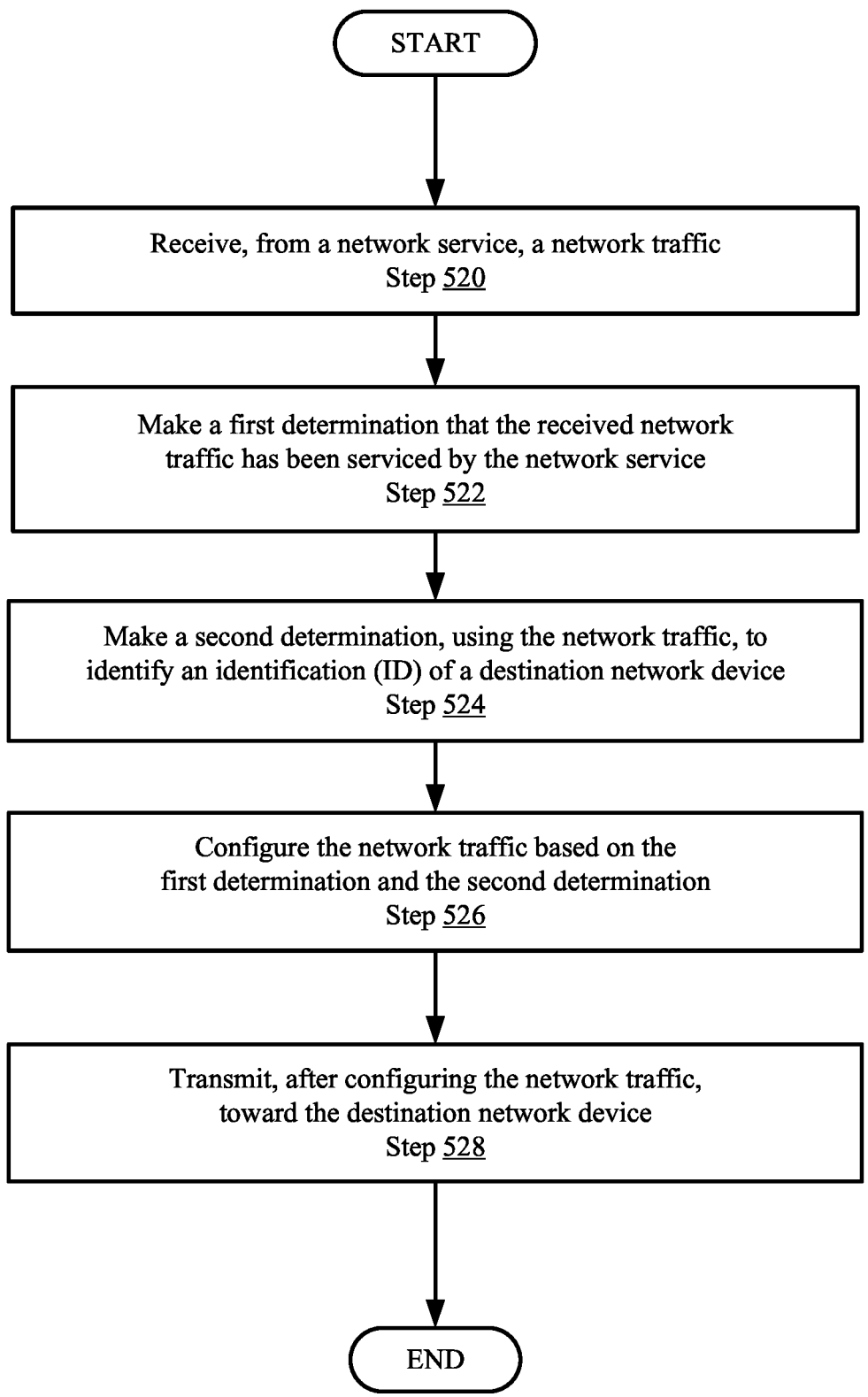
Figure 5C:
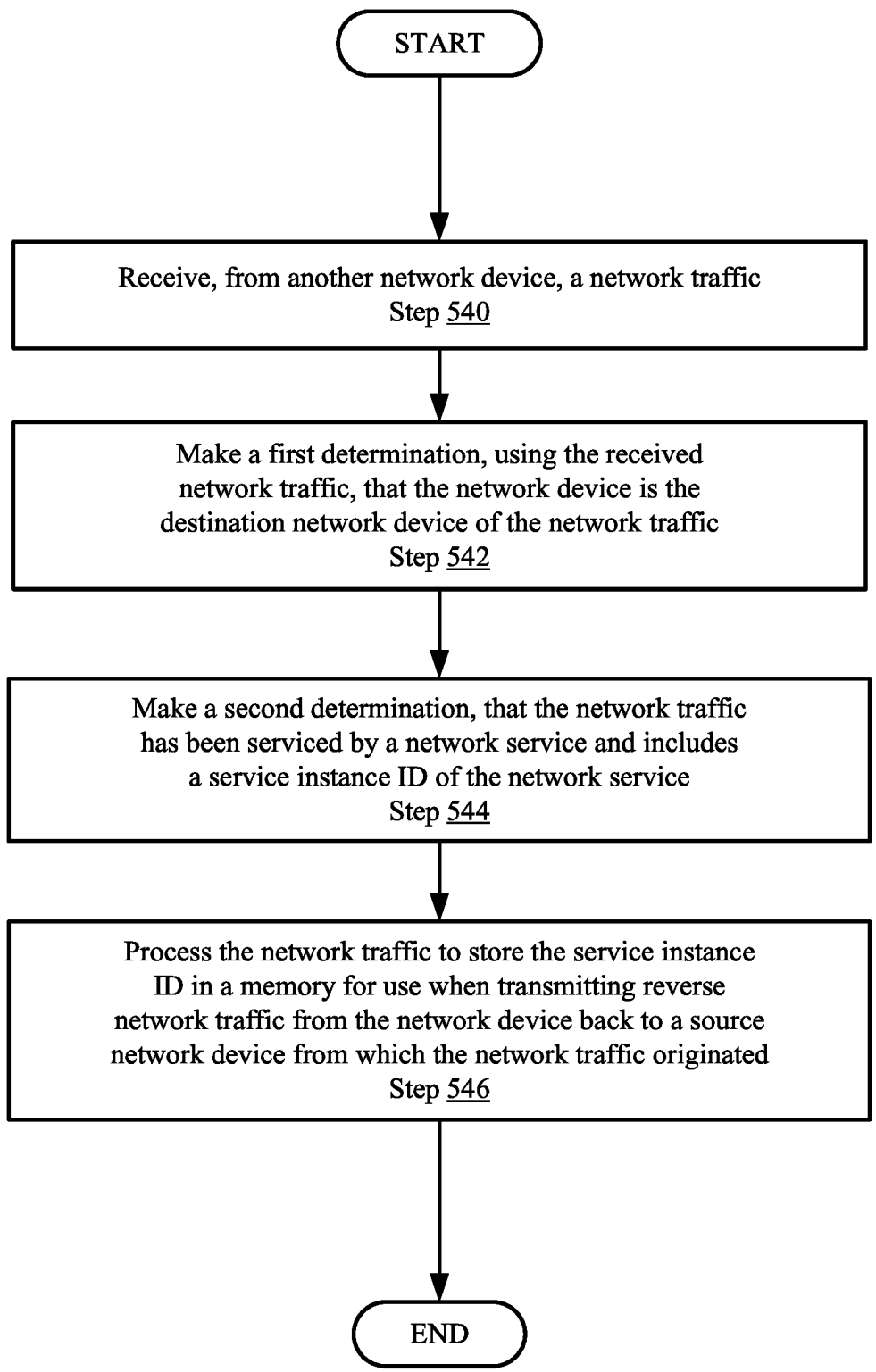

FIGS. 5A-5C show flowcharts of a method in accordance with one or more embodiments of the disclosure. The method depicted in FIGS. 5A-5C may be performed for servicing network traffic using one or more network services. The method shown in FIGS. 5A-5C may be performed by, for example, by a network device (e.g., any one of the branch network devices (e.g., 111A-111N, FIG. 1B) and the hub network devices (113A-113N, FIG. 1B)). Other components of the systems in FIGS. 1B-1E may perform all, or a portion, of the method of FIGS. 5A-5C without departing from the scope of this disclosure.

While FIGS. 5A-5C are illustrated as a series of steps, any of the steps may be omitted, performed in a different order, additional steps may be included, and/or any or all of the steps may be performed in a parallel and/or partially overlapping manner without departing from the disclosure.

Starting with FIG. 5A, FIG. 5A illustrates a process of one or more embodiments where network traffic is sent from a source network device to a service within the network.

Initially in Step 500, a request to transmit a network traffic to a destination network device is received by a network device. In one or more embodiments, the request to transmit the network traffic may specify a device address (e.g., an internet protocol (IP) address, a media access control (MAC) address, etc.) of the destination device. The request may also specify that the network traffic is to be serviced by at least one network service (e.g., at least one of the internal network services (e.g., 114A-114N, FIG. 1B) and/or one of the external network services (e.g., 115A-115N, FIG. 1B)).

In Step 502, the network device determines a path through the network (e.g., WAN (100) in FIG. 1) for reaching the at least one network service and a service instance identification (ID) of the at least one network service. In one or more embodiments, the network device may make this determination using a service-aware virtual topology (SAVT) routing table stored in a storage of the network device. In one or more embodiments, the path for reaching the at least one network service is selected from among a plurality of paths through the WAN based on a transmission impact of each of the plurality of paths on the network traffic. For example, for voice-type network traffic containing voice call data, a path with less delay and jitter would have a lower adverse transmission impact on the voice-type network traffic compared to a path with higher delay and jitter, and the path with less delay and jitter is selected.

In Step 504, the network device generates and configures the network traffic based on the information determined from the SAVT routing table. In one or more embodiments, the network device may append to a payload of the network traffic a header (e.g., a tunnel header) including at least: (i) the service instance ID of the at least one network service; (ii) a hop stack information; (iii) a service bit indicating whether service has been implemented on the network traffic; and (iv) an identification (ID) (e.g., address) of the destination network device.

In one or more embodiments, the hop stack information comprises one or more hop instructions for steering the network traffic to the destination network device and/or the at least one network service. More specifically, each hop instruction includes information specifying at least an address of a network device in the path through the network for reaching the at least one network service. The hop instructions are stacked (i.e., arranged) such that the closest network device is at the top-most part of the stack (the stack of hop instructions) while the destination is at the bottom-most part of the stack. When each network device within the path receives the network traffic, the network device will remove a top-most one of the hop instructions and forward the network traffic to the network device specified in the hop instruction below the removed top-most hop instruction. This is repeated until the network traffic reaches its destination. A detailed example of a configuration of the hop stack information is discussed below in reference to FIG. 6E.

In one or more embodiments, the service bit may be, for example but is not limited to, a binary integer indicating whether service is to be implemented (i.e., performed) on the network traffic. For example, a service bit set to "1" may indicate that the network traffic needs to be serviced while a service bit set to "0" may indicate that the network traffic does not need to be serviced.

In Step 506, after configuring the network traffic in Step 504, the network device transmits the network traffic toward the at least one network service. In one or more embodiments, the network device may transmit the network traffic to another network device specified in the top-most hop instruction of the stack of hop instructions included in the hop stack information appended to the header of the network traffic.

In one or more embodiments, once the at least one network service receives the network traffic, service will be applied to the network traffic and the at least one network service will transmit the network traffic back to the network device hosting the network service. Once service is applied to the network traffic, the service bit in the header of the network traffic is toggled to indicate that the network traffic has been serviced. This is described in more detail in reference to FIGS. 6A-6C. Additionally, the network traffic may be one network traffic within a flow including multiple network traffics. Once a service instance ID is determined (i.e., selected) for one of the network traffics within the flow, all network traffic associated with the same flow will be sent to the same network service including the selected service instance ID.

Turning now to FIG. 5B, FIG. 5B shows a process in accordance with one or more embodiments where serviced network traffic is sent from a network service that serviced the network traffic to a destination network device.

In one or more embodiments, in Step 520 of FIG. 5B, a network device (e.g., hub network device B (607B) in below FIG. 6A) hosting a network service (e.g., internal network service B (611B) in below FIG. 6A) may receive network traffic from the network service being hosted by the network device. In one or more embodiments, this network device may be the same or a different network device from the network device discussed above in reference to Step 500 of FIG. 5A. For example, the network device discussed above in reference to Step 500 of FIG. 5A may be the hub network device (607B) shown below in reference to FIG. 6A, which is the same network device discussed here in FIG. 5B that is receiving the serviced network traffic. Alternatively, the network device discussed above in reference to Step 500 of FIG. 5A may be any one of the branch network devices (609A-609D).

In Step 522, in response to receiving the network traffic from the hosted network service, the network device may make a first determination that the received network traffic has been serviced by the network service. In one or more embodiments, this first determination may be made by the network device identifying that the service bit in the network traffic (namely, the header) has been turned off to indicate that the network traffic does not need to be serviced. The network device may also identify that the network traffic includes the service instance ID of the network service.

In Step 524, the network device makes a second determination to identify an ID of a destination network device. In one or more embodiments, as discussed above in Step 504, the ID of the destination network device may be included in the header of the network traffic.

In Step 526 the network traffic is configured by the network device based on the first determination and the second determination. In one or more embodiments, the network device may first use an SAVT routing table stored in its local storage to determine a best-suited path for transmitting the network traffic to the destination network device. After determining the best-suited path, the network device may repeat the configuration process discussed above in Step 504 of FIG. 5A to step up hop instructions to be appended to a header of the network traffic. In one or more embodiments, while configuring the network traffic, the network device leaves the service bit off and retains the service instance ID of the network service to indicate to the destination network device that the network traffic has already been serviced.

In Step 528, after configuring the network traffic in Step 526, the network device transmits the network traffic toward the destination network device. In one or more embodiments, similar to above Step 506 of FIG. 5A, the network traffic is transmitted to a network device specified by a top-most hop instruction of the stack of hop instructions included in the hop stack information appended to the header of the network traffic.

In one or more embodiments, in reference to above FIGS. 5A and 5B, a transmission disruption may occur while a network traffic is transmitted from the source network device to a network service (FIG. 5A) and/or from a network service to the destination network device (FIG. 5B). Such transmission disruption may include, for example, when a network device within the path programmed in the network traffic goes offline and cannot be reached. When another network device within the programmed path (herein referred to as an "intermediate network device") detects such a transmission disruption, this intermediate network device may either: (i) before the network traffic has reached the service, execute the processes executed by the source network device (in FIG. 5A) to configure a new path for the network traffic to reach the network service; or (ii) after the network traffic has been serviced, execute the processes executed by a network device hosting a network service (in FIG. 5B) to configure a new path for the serviced network traffic to reach the destination network device.

Turning now to FIG. 5C, FIG. 5C shows a process in accordance with one or more embodiments performed by a destination network device upon receipt of a serviced network traffic.

Initially in Step 540 of FIG. 5C, a network device receives from another network device, a network traffic. In one or more embodiments, this network device is configured as the destination network device for the received network traffic. This destination network may be any network device (e.g., hub or branch) within the network.

In Step 542, in response to receiving the network traffic and using the received network traffic, the network device makes a first determination that the network device is the destination network device of the network traffic. In one or more embodiments, the network device may parse the header of the network traffic to find the ID of the network device specified in a destination network device field of the header. If the ID specified in the destination network device field matches its own ID, the network device determines that it is the destination network device.

In Step 544, the network device makes a second determination that the network traffic has been serviced by a network service and includes a service instance ID of the network service that serviced the network traffic. In one or more embodiments, the network device may parse the header to determine that a service bit in the header has been turned off while a portion of the header still includes a service instance ID of a network service. This indicates to the network device that the network traffic has been serviced by the network service associated with the service instance ID retained in the header of the network traffic.

In Step 546, the network device processes the network traffic to store the service instance ID in a memory (e.g., a flow cache) of the network device. In one or more embodiments, this storing of the service instance ID in the memory allows the network device to advantageously use the same service for all return network traffic the network device may transmit to the original source of the serviced network traffic (e.g., the source network device from which the serviced network traffic originated).

To further clarify embodiments of the disclosure, an example is provided in FIGS. 6A-6E. The numbers in the brackets below, e.g., "[1]", correspond to the same circled numbers in FIGS. 6A-6C.

Start of Example

Figure 6A:
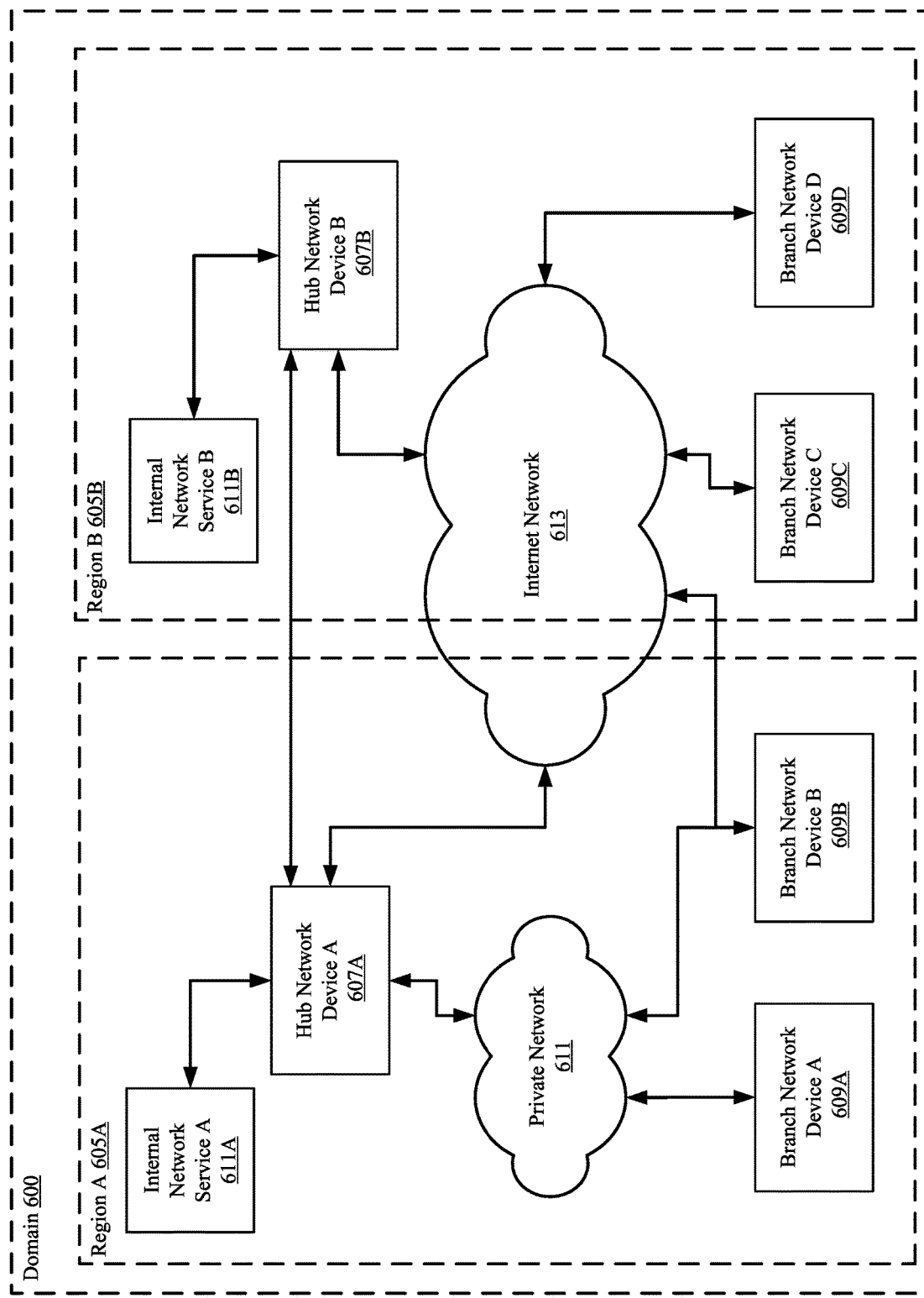

Initially, FIG. 6A shows how each of the network devices (i.e., all of the hub network devices (607A & 607B) and branch network devices (609A-609D)) and services (internal network services (611A & 611B) are interconnected. In FIG. 6A, hub network device A (607A) is hosting internal network service A (611A) while hub network device B (607B) is hosting internal network service B (611B). In addition to all of the connections previously shown in FIGS. 3A-3C, an additional connection (e.g., through another MPLS, another internet network, a direct wired connection, etc.) that directly connects hub network device A (607A) and hub network device B (607B) without going through the internet network (613) is added. Assume that each of the network devices is already provided with its own SAVT routing table derived using the topology shown in FIG. 6A. Now further assume that branch network device B (609B) wishes to transmit network traffic to branch device C (609C). Referring back to FIG. 3C, branch network device B (609B) may choose either of path P1 or path P2 to transmit the network traffic. However, further assume now that the network traffic is intended (e.g., by a user connected to branch network device B (609B)) to be serviced by one of the services (i.e., internal network service A (611A) or internal network service B (611B)). As a result, path P2 cannot be used because it does not go through either of the services. One example of how the network traffic can be transmitted from branch network device B (609B) to branch network device C (609C) while being serviced by one of the services is discussed as follows in FIGS. 6B-6C.

Figure 6B:
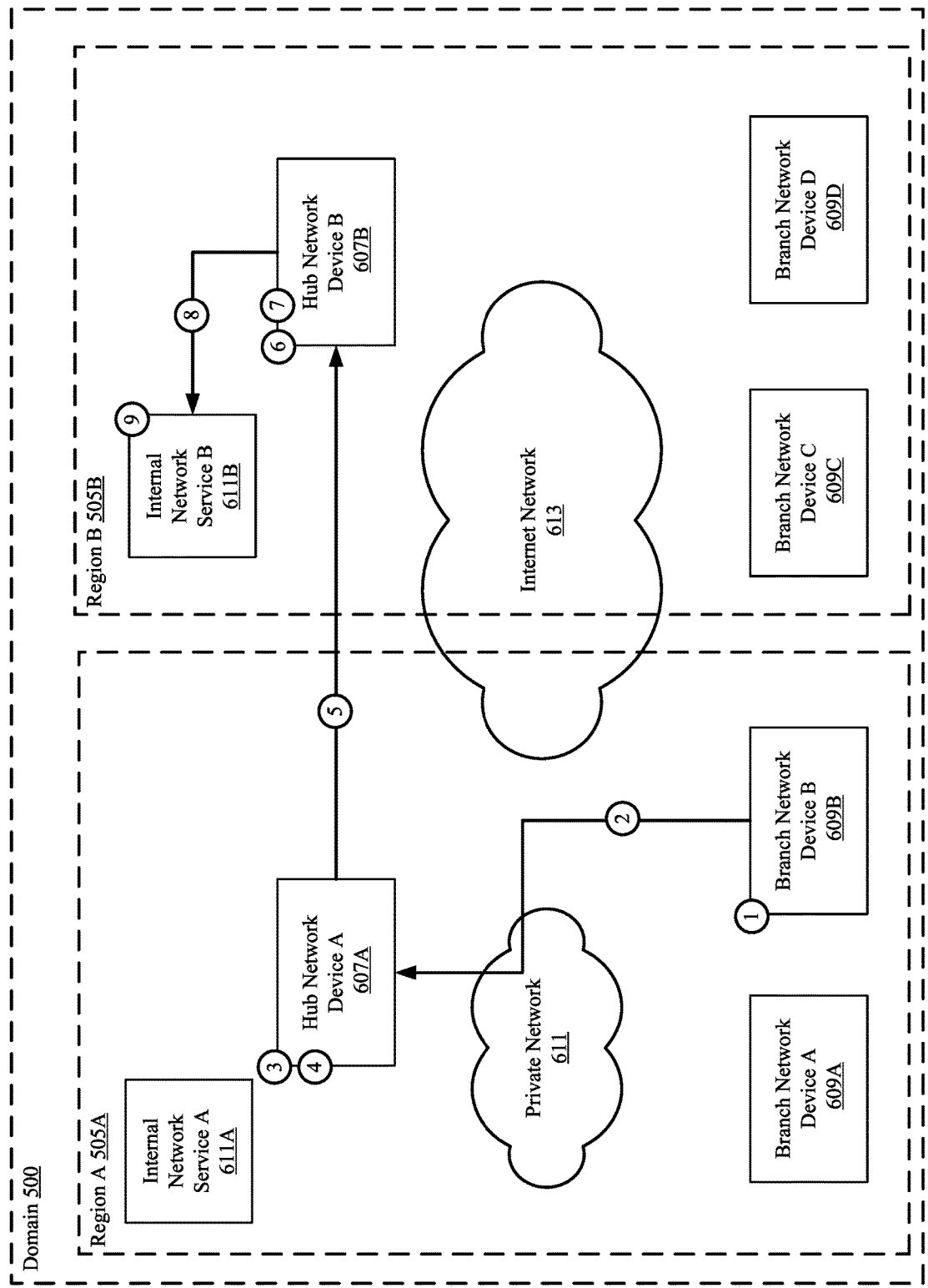

Turning now to FIG. 6B, assume that branch network device B (609B) knows from its SAVT routing table that the possible paths to either one of the services includes:

Path (i): Branch network device B (609B)→hub network device A (607A)→internal network services A (611A).

Path (ii): Branch network device B (609B)→hub network device A (607A)→hub network device B (607B)→internal network services B (611B).

Path (iii): Branch network device B (609B)→hub network device A (607A)→internet network (613)→hub network device B (607B)→internal network services B (611B).

Now assume that branch network device B (609B) chooses path (ii) from its SAVT routing table. In response to selecting path (ii), branch network device B (609B) configures the network traffic to use internal network service B (611B) and path (ii) by: (A) adding hop stacks information reflecting path (ii) in the header of the network packet; (B) configuring a service bit in the header to indicate that service has not yet been performed (i.e., implemented) on the network traffic; and (C) configuring the header to include a service instance ID of internal network service B (611B) [1].

After configuring the network traffic, branch network device B (609B) transmits the network traffic to hub network device A (607A) [2]. Hub network device A (607A) receives the network traffic [3]. After receiving the network traffic, hub network device A (607A) checks the hop stacks information in the header of the network traffic and determines that the network traffic is to be transmitted directly to hub network device B (607B) [4].

Subsequently, hub network device A (607A) updates the hop stacks information in the header of the network packet and transmits the network traffic to hub network device B (607B) [5]. Hub network device B (607B) receives the network traffic from hub network device A (607A) [6]. After receiving the network traffic, hub network device B (607B) checks the hop stacks information in the header and determines it is the last hop along path (ii); hub network device B (607B) then determines using the service bit in the header that the network traffic should be serviced [7]. As a result of these determinations, hub network device B (607B) locally transmits the network traffic to internal network service B (611B) [8]. Internal network service B (611B) receives the network traffic [9].

Figure 6C:
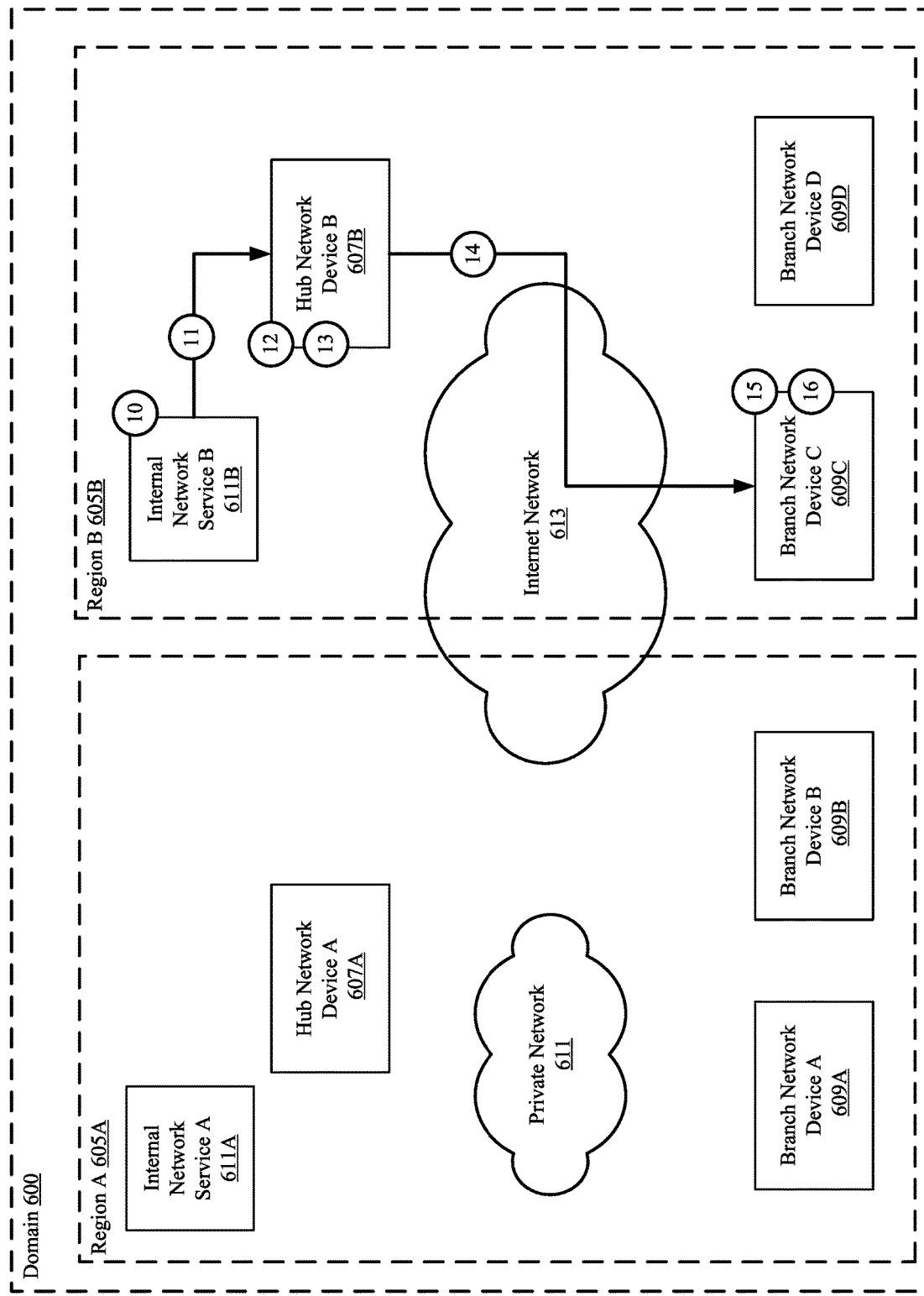

Turning now to FIG. 6C, internal network service B (611B) services the network traffic [10]. After servicing the network traffic, internal network service B (611B) transmits the network traffic back to hub network device B (607B) [11]. Hub network device B (607B) receives the serviced network traffic, determines that the network traffic has been serviced, updates the service bit in the header of the network traffic to reflect that the network traffic has been serviced, and adds a service instance ID of internal network service B (611B) into the header of the network packet [12].

Subsequently, hub network device B (607B) checks its virtual topology routing table (e.g., its SAVT routing table), selects a direct path to branch network device C (609C) via the internet network (613), and configures the network traffic with hop stacks information reflecting this path [13]. Hub network device B (607B) then transmits the network traffic to branch network device C (609C) [14].

Finally, branch network device C (609C) receives the network traffic, processes the network traffic, and records the service instance ID of internal network service B (611B) in its flow cache [15]. At a later point in time when branch network device C (609C) determines that it needs to send reverse network traffic back to branch network device B (609B), branch network device C (609C) checks its flow cache, identifies the service instance ID of internal network service B (611B), and configures a header of the reverse network traffic to include the service instance ID of internal network service B (611B) such that the reverse network traffic will also be serviced by internal network service B (611B) before reaching branch network device B (609B) [16].

Turning now to FIG. 6D, FIG. 6D shows an example SAVT of branch network device B (609B) as applied to the above example discussed in FIGS. 6A-6C. As shown in FIG. 6D, the service-aware virtual topology (SAVT) routing table (690) in FIG. 6D shows the best-suited path(s) for application 1 (APP-1) associated with the network traffic to internal network service A (e.g., 611A, FIGS. 6A-6C) and to internal network service B (e.g., 611B, FIGS. 6A-6C). For example, route [1] and route [2] for reaching internal network service B corresponds to above-discussed paths (ii) and (iii), respectively, while the sole route for reaching internal network service A corresponds to above discussed path (i).

Similar to the AAVT routing table (411) shown above in reference to FIG. 4, the SAVT routing table (690) specifies the specific link (e.g., LINK-X, LINK-Y, LINK-Z, etc.) of each network device used for transmitting network traffic associated with each application classification. The SAVT routing table (690) further specifies where each network service is hosted in the destination (DST) column and includes an additional column specifying the service instance identification (ID) of each network service.

Figure 6E:
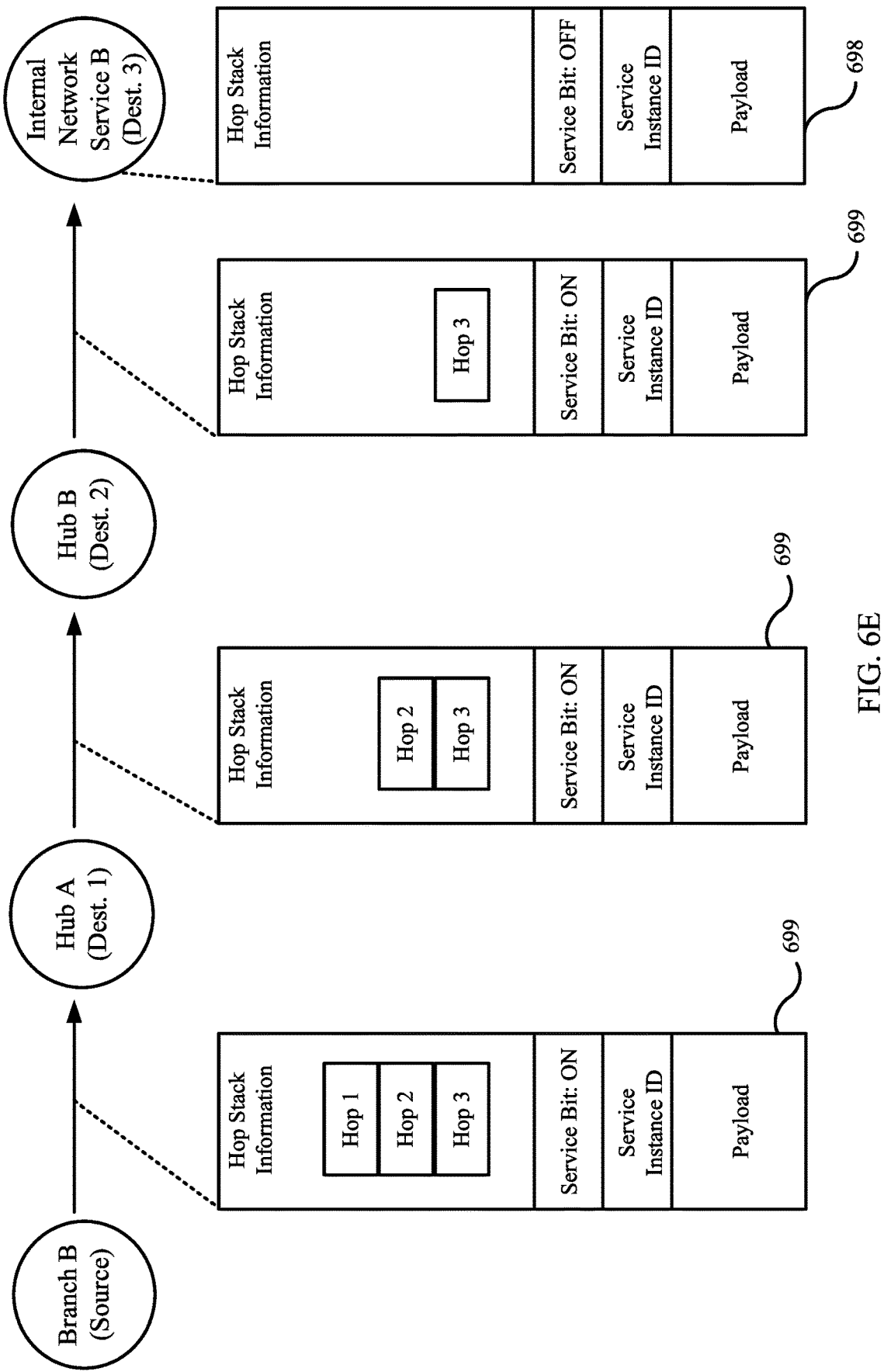

Turning now to FIG. 6E, FIG. 6E shows an example configuration of a hop stack for transmitting the network traffic from a source (branch network device B) to a destination (internal network service B) consistent with the example discussed above in reference to FIGS. 6A-6C.

As shown in FIG. 6E, a network traffic (699) is transmitted from the source to a first destination (e.g., dest. 1; hub network device A (Hub A)). The network traffic (699) includes at least a payload, a service instance ID of internal network service B, a service bit that is turned on to indicate that service is to be implemented on the network traffic (699), hop stack information showing three hop instructions (e.g., Hop 1, Hop 2, Hop 3). The hop stack information, the service bit, and the service instance ID of the network traffic (699) is included in a header (e.g., a tunnel header) of the network traffic (699).

Each of the hop instructions in the hop stacks information portion of the network traffic (699) corresponds to one of the network devices within the path to internal network service B. For example, Hop 1 includes the address of hub network device A (Hub A), Hop 2 includes the address of hub network device B (Hub B), and Hop 3 includes the address of the computing system executing internal network service B. In this example shown in FIG. 6E, Hop 1 is at the top of the hop stack while Hop 3 is at the bottom of the Hop stack.

As shown in FIG. 6E, after Hub A receives network traffic (699), Hub A removes the top-most hop instruction (Hop 1) before forwarding the network traffic (699) along to Hub B based on the information specified in Hop 2. Similarly, Hub B receives network traffic (699), removes the top-most hop instruction (Hop 2), and forwards the network traffic (699) to internal network service B based on the information specified in Hop 3.

Finally, in response to receiving the network traffic (699), internal network service B determines that Hop 3 and the service instance ID specify information about itself and understands that it is the last device within the path. Internal network service B determines from the service bit being ON that the network traffic (699) is to be serviced and services the network traffic (699) to generate a serviced network traffic (698). In the serviced network traffic (698), the final hop instruction (Hop 3) is removed, the service bit is turned off to indicate that the network traffic has been serviced, and the service instance ID of internal network service B is retained to indicate that the serviced network traffic (698) is serviced by internal network device B.

End of Example

Figure 7:
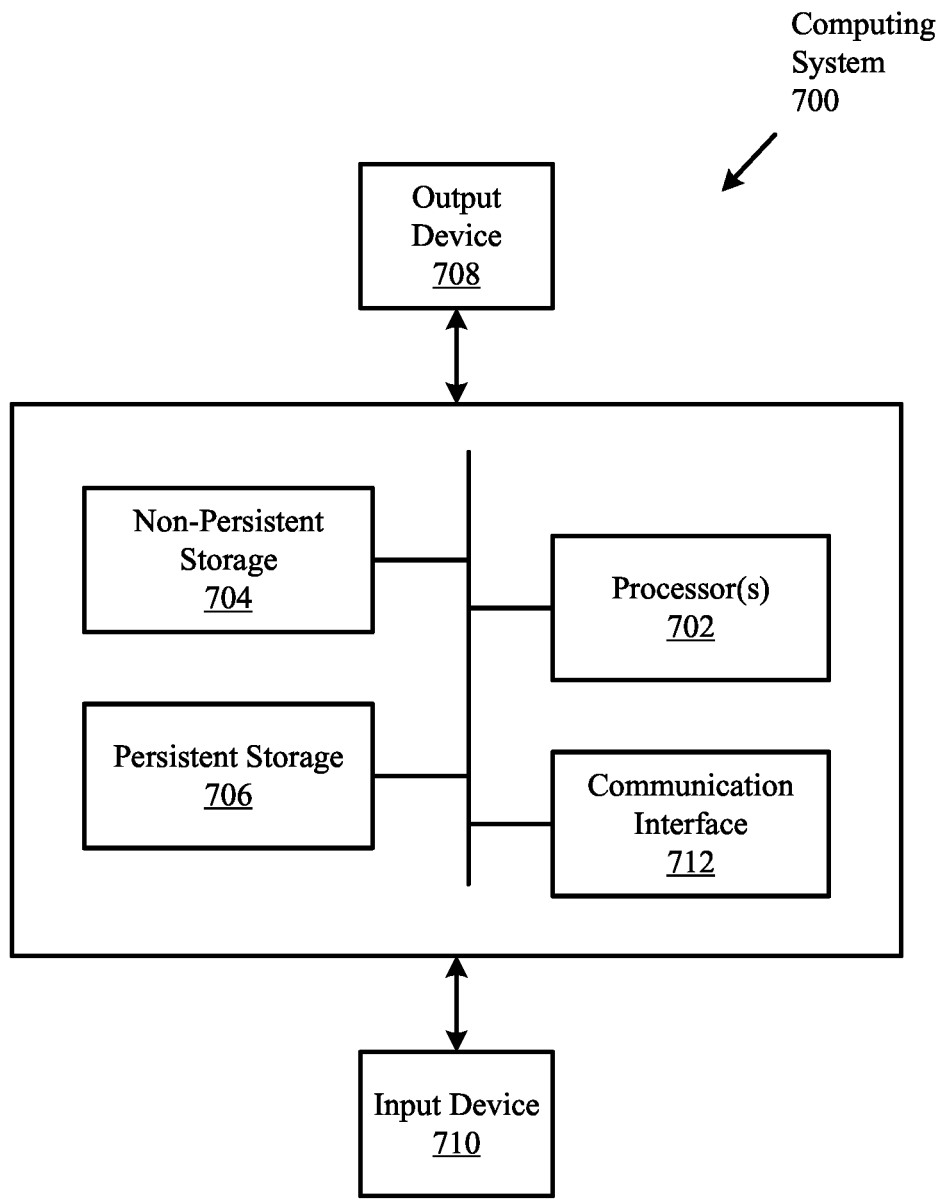
FIG. 7 shows a diagram of a computing device in accordance with one or more embodiments described herein.

As discussed above, embodiments disclosed herein may be implemented using computing devices. FIG. 7 shows a diagram of a computing device in accordance with one or more embodiments disclosed herein. Computing device (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), communication interface (712) (e.g., Bluetooth interface, infrared interface, network interface, optical interface, etc.), input devices (710), output devices (708), and numerous other elements (not shown) and functionalities. Each of these components is described below.

In one embodiment disclosed herein, computer processor(s) (702) may be an integrated circuit for processing instructions. For example, the computer processor(s) may be one or more cores or micro-cores of a processor. Computing device (700) may also include one or more input devices (710), such as a touchscreen, keyboard, mouse, microphone, touchpad, electronic pen, or any other type of input device. Further, communication interface (712) may include an integrated circuit for connecting computing device (700) to a network (not shown) (e.g., a local area network (LAN), a wide area network (WAN) such as the Internet, mobile network, or any other type of network) and/or to another device, such as another computing device.

In one embodiment disclosed herein, computing device (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to computer processor(s) (702), non-persistent storage (704), and persistent storage (706). Many different types of computing devices exist, and the aforementioned input and output device(s) may take other forms.

As shown above, specific embodiments have been described with reference to the accompanying figures. In the above description, numerous details are set forth as examples. It will be understood by those skilled in the art, and having the benefit of this Detailed Description, that one or more embodiments described herein may be practiced without these specific details and that numerous variations or modifications may be possible without departing from the scope of the embodiments. Certain details known to those of ordinary skill in the art may be omitted to avoid obscuring the description.

In the above description of the figures, any component described with regard to a figure, in various embodiments, may be equivalent to one or more like-named components shown and/or described with regard to any other figure. For brevity, descriptions of these components may not be repeated with regard to each figure. Thus, each and every embodiment of the components of each figure is incorporated by reference and assumed to be optionally present within every other figure having one or more like-named components. Additionally, in accordance with various embodiments described herein, any description of the components of a figure is to be interpreted as an optional embodiment, which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from (or can be the same as) a second element, and the first element may encompass more than one element and succeed (or precede) the second element in an ordering of elements.

As used herein, the term connected, or connection, means that there exists between elements/components/devices a direct or indirect connection that allows the elements to interact with one another in some way. For example, the term 'connected' may refer to any direct (e.g., wired and/or wireless directly between two devices or components) or indirect (e.g., wired and/or wireless connections between any number of devices or components connecting the connected devices) connection. Thus, any path through which information may travel may be considered an operative connection.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for servicing network traffic in a wide area network (WAN) comprising a plurality of network devices, the method being executed by a network device among the plurality of network devices and comprising:

receiving a request to transmit the network traffic to a destination network device, wherein the destination network device is one among the plurality of network devices, and wherein the request specifies that the network traffic is to be serviced by a first network service among a plurality of network services prior to being received by the destination network device;

determining, using a service-aware virtual topology (SAVT) routing table stored in the network device, a path through the WAN for reaching the first network service and a service instance identifier (ID) of the first network service, wherein the path is selected from among a plurality of paths through the WAN stored in the SAVT routing table;

after the determining, modifying a header of the network traffic to:
   configure a service bit in the header to indicate that service is to be performed on the network traffic; and
   add hop stacks information reflecting the path for reaching the network service, wherein the hop stacks information comprises a stack of hop instructions, wherein each hop instruction among the hop instructions specifies another network device among the plurality of network devices that is on the path for reaching the first network service,
   wherein the header of the network traffic includes an identification (ID) of the destination network device; and transmitting, after modifying the header of the network traffic and toward the first network service, the network traffic to a network device among the plurality of network devices specified by a first hop instruction among the hop instructions in the header of the network traffic.

2. The method of claim 1, further comprising by the network device:
   receiving, from a second network service among the plurality of network services, second network traffic, wherein the second network traffic includes the ID of the destination network device and the second network traffic is a serviced version of the first network traffic;
   making a first determination, after receiving the second network traffic and using a header of the second network traffic, that the second network traffic has been serviced by the second network service;
   making a second determination, after the first determination and using the SAVT and the ID of the destination network device, to select a path through the WAN for reaching the destination network device;
   after the second determination, modifying the header of the second network traffic to:
      configure a service bit in the header of the second network traffic to indicate that the second network traffic has been serviced;
      add a service instance ID of the second network service to a first portion of the header of the second network traffic; and
      add second hop stacks information reflecting the path for reaching the destination network device to a second portion of the header of the second network traffic; and
   transmitting, after modifying the header of the second network traffic and based on the second hop stacks information, the second network traffic toward the destination network device.

3. The method of claim 2, wherein the second network service is an internal network service hosted by the network device, and wherein the second network service is the same as the first network service.

4. The method of claim 2, wherein the second network service is an external network service reachable only through a secure internet gateway (SIG) of the network device.

5. The method of claim 1, further comprising by the network device:
   receiving, from a second network device among the network devices, second network traffic, wherein the network device is specified as the destination network device in a header of the second network traffic;
   making a first determination, after receiving the second network traffic and using the header of the second network traffic, that the second network traffic has been serviced by a second network service of the plurality of network services;
   processing, after making the first determination and using the header of the second network traffic, the second network traffic by storing the service instance ID of the second network service in the network device, wherein the service instance ID of the second network service is stored in a flow cache of the network device;
   making a second determination, after processing the second network traffic, that a reverse network traffic is to be transmitted back to a source network device where the second network traffic originated;
   after the second determination, generating the reverse network traffic and modifying a header of the reverse network traffic to comprise:
      the service bit indicating that service is to be performed on the reverse network traffic; and
      the service instance ID of the second network service, wherein the service instance ID of the second network service is retrieved from the flow cache; and
   transmitting, after modifying the header of the reverse network traffic, the reverse network traffic toward the second network service.

6. The method of claim 5, wherein
   the second network traffic further comprises second hop stacks information reflecting a path from the second network service to the network device,
   the network device further stores the second hop stacks information in the flow cache, and
   the reverse network traffic is modified to include third hop stacks information reflecting a reverse path of the path from the second network service to the network device specified in the second hop stacks information.

7. A method for servicing network traffic in a wide area network (WAN) comprising a plurality of network devices, the method being executed by a network device among the plurality of network devices and comprising:
   receiving a request to transmit the network traffic to a destination network device among the plurality of network devices, wherein the request specifies that the network traffic is to be serviced by at least one network service among a plurality of network services;
   determining, based on the request and using a service-aware virtual topology (SAVT) routing table, a path through the WAN for reaching the at least one network service and a service instance identifier (ID) of the at least one network service;
   configuring, based on the determining, the network traffic to include a service bit indicating whether service is to be performed on the network traffic and instructions specifying the path for reaching the at least one network service; and transmitting, after configuring the network traffic, the network traffic toward the destination device through the at least one network service.

8. The method of claim 7, wherein the path for reaching the at least one network service is selected from among a plurality of paths through the WAN based on a transmission impact of each of the plurality of paths on the network traffic.

9. The method of claim 8, wherein the at least one network service is an internal network service hosted by the network device or an external network service reachable through a secure internet gateway (SIG) of the network device.

10. The method of claim 7, wherein the service bit is stored in a header of the network traffic.

11. The method of claim 10, wherein
the instructions specifying the path for reaching the at least one network service is stored in a header of the network traffic, and
the instructions specifying the path for reaching the at least one network service is hop stacks information reflecting the path for reaching the at least one network service,
wherein the hop stacks information comprises a stack of hop instructions and each hop instruction among the hop instructions specifies another network device among the plurality of network devices that is on the path for reaching the at least one network service.

12. The method of claim 11, wherein the instructions specifying the path for reaching the at least one network service is used by the destination network device to configure a reverse network traffic to be transmitted back to the network device by the destination network device.

13. The method of claim 7, wherein the service instance ID of the at least one network service is used by the destination network device such that a reverse network traffic being transmitted by the destination network device back to the network device is serviced by a same one of the at least one network service.

14. The method of claim 7, further comprising:
receiving second network traffic from a network service from the at least one network service, wherein the second network traffic is a serviced version of the first network traffic;
making a first determination, after receiving the second network traffic and using a header of the second network traffic, that the second network traffic has been serviced by the at least one network service and that the second network traffic includes an identification (ID) of the destination network device;
configuring, after the first determination, the second network traffic using the SAVT and the ID of the destination network device to transmit the second network traffic to the destination device;
transmitting, after configuring the second network traffic, the second network traffic toward the destination network device.

15. The method of claim 7, wherein
transmitting, after configuring the network traffic, the network traffic toward the destination device through the at least one network service comprises:
transmitting the network traffic through one or more intermediate network devices before reaching the at least one network service or the destination device, wherein if a transmission disruption occurs at one of the one or more intermediate network devices before the network traffic reaches the at least one network service or the destination device, the one of the one or more intermediate network devices where the transmission disruption occurs will reconfigure the network traffic using its SAVT routing table, the service bit included in the network traffic, and the service instance ID of the at least one network service.

16. A network device among a plurality of network devices connected on a wide area network (WAN), the network device comprising:
a storage storing a service-aware virtual topology (SAVT) routing table; and
a processor connected to the storage, wherein the processor is configured to:
receive, from another network device among the network devices, network traffic;
make a first determination, after receiving the network traffic and using the network traffic, that the network device is specified as a destination network device for the received network traffic;
make a second determination that the received network traffic has been serviced by a network service among a plurality of network services on the WAN; and
process, after the first determination and the second determination, the network traffic to store information about the received network traffic in the storage,
wherein the information about the received network traffic is used along with the SAVT to configure reverse network traffic that is transmitted back to a source network device that first transmitted the received network traffic.

17. The network device of claim 16, wherein
the first determination and the second determination are made using information stored in a header of the received network traffic, and
the header of received network traffic comprises:
an identification (ID) of the network device set as the destination network device;
a service instance ID of the network service that serviced the received network traffic; and
a service bit indicating whether the network traffic has been serviced.

18. The network device of claim 17, wherein the information about the received network traffic stored in the storage comprises the service instance ID, and wherein the storage further comprises a flow cache of the network device.

19. The network device of claim 17, wherein configuring the reverse network traffic to the source of the received network traffic comprises:
generating the reverse network traffic; and
modifying a header of the generated reverse network traffic to comprise:
an ID of the source network device;
the service bit, wherein the service bit is configured to indicate that the reversed network traffic needs to be serviced before reaching the source network device; and
the service instance ID of the network service that serviced the received network traffic such that the reverse network traffic will also be serviced by the network service that serviced the received network traffic.

20. The network device of claim 18, wherein
the header of the received network traffic further comprises hop stacks information reflecting a path within the WAN from the network service to the network device, and the network device further stores the hop stacks information in the flow cache to use the hop stacks information for the reverse network traffic.

\* \* \* \* \*